United States Patent
Jun et al.

(10) Patent No.: US 11,355,052 B2
(45) Date of Patent: Jun. 7, 2022

(54) DISPLAY APPARATUS AND DISPLAY SYSTEM

(71) Applicant: Samsung Display Co., Ltd., Yongin-Si (KR)

(72) Inventors: Tae-Jong Jun, Suwon-si (KR); Jae Sung Bae, Suwon-si (KR); Sanghyun Lee, Yongin-si (KR); Daeki Park, Seoul (KR); Namjae Lim, Gwacheon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 86 days.

(21) Appl. No.: 16/700,187

(22) Filed: Dec. 2, 2019

(65) Prior Publication Data

US 2020/0226969 A1 Jul. 16, 2020

(30) Foreign Application Priority Data

Jan. 15, 2019 (KR) .......... 10-2019-0005220

(51) Int. Cl.
| | |
|---|---|
| *G09G 3/20* | (2006.01) |
| *G09G 5/14* | (2006.01) |
| *G06F 3/14* | (2006.01) |

(52) U.S. Cl.
CPC ......... *G09G 3/2007* (2013.01); *G09G 3/2003* (2013.01); *G09G 5/14* (2013.01);
(Continued)

(58) Field of Classification Search
CPC ...... G09G 3/2007; G09G 3/2003; G09G 5/14; G09G 2300/026; G09G 2310/0232;
(Continued)

(56) References Cited

U.S. PATENT DOCUMENTS

| | | |
|---|---|---|
| 2005/0093798 A1 | 5/2005 | Kamada et al. |
| 2010/0053450 A1 | 3/2010 | Hanamura et al. |

(Continued)

FOREIGN PATENT DOCUMENTS

| | | |
|---|---|---|
| JP | 6105907 B2 | 3/2017 |
| KR | 1020170026878 A | 3/2017 |
| KR | 1020190009022 A | 1/2019 |

OTHER PUBLICATIONS

Extended European Search Report for Application No. 20152075.6-1210 dated Mar. 13, 2020.

*Primary Examiner* — Patrick N Edouard
*Assistant Examiner* — Douglas M Wilson
(74) *Attorney, Agent, or Firm* — Cantor Colburn LLP

(57) ABSTRACT

A display apparatus includes a display panel including a plurality of pixels, and a driver which receives input image data, generates final image data by compensating the input image data to increase luminances of pixels disposed in at least one edge portion of the display panel among the plurality of pixels, and drives the display panel based on the final image data. The input image data for a pixel of the pixels is compensated based on a compensation constant determined according to a position of the pixel when the input image data for the pixel represents a gray level higher than or equal to a first reference gray level, and is compensated based on a reduced compensation constant that is reduced from the determined compensation constant when the input image data for the pixel represents the gray level lower than the first reference gray level.

18 Claims, 18 Drawing Sheets

(52) U.S. Cl.
CPC ..... *G06F 3/1446* (2013.01); *G09G 2300/026* (2013.01); *G09G 2310/027* (2013.01); *G09G 2310/0232* (2013.01); *G09G 2320/0233* (2013.01); *G09G 2320/0271* (2013.01); *G09G 2320/0626* (2013.01); *G09G 2320/0673* (2013.01); *G09G 2360/04* (2013.01); *G09G 2360/16* (2013.01)

(58) Field of Classification Search
CPC ......... G09G 2310/027; G09G 2310/08; G09G 2320/0233; G09G 2320/0626; G09G 2320/0673; G09G 2360/16; G09G 3/3648; G09G 2320/0271; G09G 2320/0285; G09G 3/3685; G09G 3/3275; G06F 3/1446

See application file for complete search history.

(56) References Cited

U.S. PATENT DOCUMENTS

| | | | |
|---|---|---|---|
| 2013/0135272 A1* | 5/2013 | Park | G09G 3/3233 345/211 |
| 2013/0194494 A1* | 8/2013 | Chun | G09G 3/3233 348/453 |
| 2015/0287350 A1* | 10/2015 | Jun | G09G 3/006 345/690 |
| 2016/0351133 A1* | 12/2016 | Kim | G09G 3/3406 |
| 2017/0316754 A1 | 11/2017 | Katougi et al. | |
| 2018/0040271 A1 | 2/2018 | Jung et al. | |
| 2018/0130425 A1* | 5/2018 | Choi | G06F 3/1446 |
| 2018/0158173 A1* | 6/2018 | Gao | G06T 5/009 |
| 2018/0190747 A1* | 7/2018 | Son | G06F 1/1637 |
| 2019/0019474 A1 | 1/2019 | Jun et al. | |
| 2019/0237001 A1* | 8/2019 | Lin | G09G 3/3208 |

* cited by examiner

| Model | BZW | P_BZW(As-Is) | P_BZW | P_BZW(Ideal) |
|---|---|---|---|---|
| A | 2.30mm | 3.28mm | 2.76mm | 2.33mm |
| B | 1.49mm | 2.68mm | 1.95mm | 1.48mm |

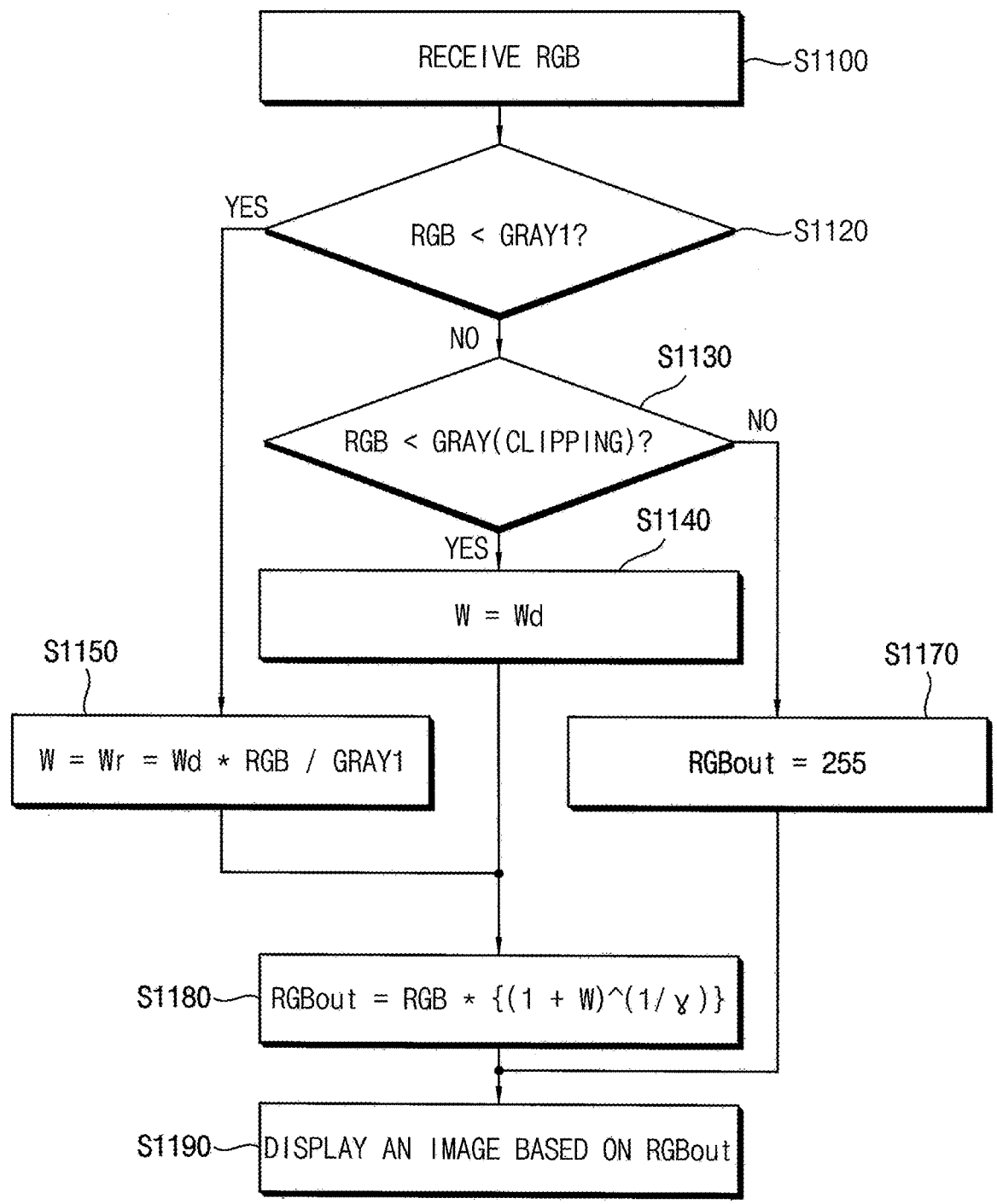

DISPLAY APPARATUS AND DISPLAY SYSTEM

This application claims priority to Korean Patent Application No. 10-2019-0005220, filed on Jan. 15, 2019, and all the benefits accruing therefrom under 35 U.S.C. § 119, the content of which in its entirety is herein incorporated by reference.

BACKGROUND

1. Field

Exemplary embodiments of the invention relate to a display apparatus, and more particularly to a display apparatus and a display system including the display apparatus.

2. Description of the Related Art

A display apparatus, such as a liquid crystal display ("LCD") apparatus and an organic light emitting display apparatus, includes a display panel and a panel driver which drives the display panel. The display panel includes a plurality of gate lines, a plurality of data lines and a plurality of pixels connected to the gate lines and the data lines. The panel driver includes a gate driver providing gate signals to the gate lines and a data driver providing data voltages to the data lines.

In general, the LCD apparatus includes a first substrate including a pixel electrode, a second substrate including a common electrode and a liquid crystal layer disposed between the first and second substrates. An electric field is generated by voltages applied to the pixel electrode and the common electrode. By adjusting an intensity of the electric field, a transmittance of light passing through the liquid crystal layer may be adjusted such that a desired image may be displayed.

The organic light emitting display apparatus displays images using organic light emitting diodes ("OLEDs"). The OLED generally includes an organic layer between two electrodes, i.e., an anode and a cathode. Holes from the anode may be combined with electrons from the cathode in the organic layer between the anode and the cathode to emit light.

A tiled display apparatus is used as a substantially large display apparatus by integrating a plurality of display apparatuses for displaying an ultra-high resolution image. The tiled display apparatus includes bezels disposed between the plurality of display apparatuses.

SUMMARY

Some exemplary embodiments provide a display apparatus capable of improving display quality.

Some exemplary embodiments provide a display system including the display apparatus.

An exemplary embodiment provides a display apparatus including a display panel including a plurality of pixels, and a driver which receives input image data, generates final image data by compensating the input image data to increase luminances of pixels disposed in at least one edge portion of the display panel among the plurality of pixels, and drives the display panel based on the final image data. The input image data for a pixel of the pixels is compensated based on a compensation constant determined according to a position of the pixel when the input image data for the pixel represents a gray level higher than or equal to a first reference gray level, and is compensated based on a reduced compensation constant that is reduced from the determined compensation constant when the input image data for the pixel represents the gray level lower than the first reference gray level.

In an exemplary embodiment, the reduced compensation constant may gradually increase as the gray level of the input image data increases from a minimum gray level to the first reference gray level.

In an exemplary embodiment, the minimum gray level may be a 0-gray level.

In an exemplary embodiment, the reduced compensation constant may linearly increase as the gray level of the input image data increases from a minimum gray level to the first reference gray level.

In an exemplary embodiment, when the input image data for the pixel represents the gray level lower than the first reference gray level, the driver may calculate the reduced compensation constant for the pixel by an equation "$Wr=Wd*RGB/GRAY1$", where $Wr$ represents the reduced compensation constant for the pixel, $Wd$ represents the determined compensation constant for the pixel, $RGB$ represents the input image data for the pixel, and $GRAY1$ represents the first reference gray level, and generate the final image data for the pixel by compensating the input image data for the pixel by an equation "$RGBout=RGB*\{(1+Wr)^{(1/\gamma)}\}$", where $RGBout$ represents the final image data for the pixel, and $\gamma$ represents a gamma value of the display apparatus.

In an exemplary embodiment, the driver may generate the final image data for the pixel a same as the input image data for the pixel when the input image data for the pixel represents the gray level lower than a second reference gray level, and where the second reference gray level may be lower than the first reference gray level.

In an exemplary embodiment, the reduced compensation constant may gradually increase as the gray level of the input image data increases from the second reference gray level to the first reference gray level.

In an exemplary embodiment, when the input image data for the pixel represents the gray level higher than or equal to the second reference gray level and lower than the first reference gray level, the driver may calculate the reduced compensation constant for the pixel by an equation "$Wr=Wd*(RGB-GRAY2)/(GRAY1-GRAY2)$", where $Wr$ represents the reduced compensation constant for the pixel, $Wd$ represents the determined compensation constant for the pixel, $RGB$ represents the input image data for the pixel, $GRAY1$ represents the first reference gray level, and $GRAY2$ represents the second reference gray level, and generate the final image data for the pixel by compensating the input image data for the pixel by an equation "$RGBout=RGB*\{(1+Wr)^{(1/\gamma)}\}$", where $RGBout$ represents the final image data for the pixel, and $\gamma$ represents a gamma value of the display apparatus.

In an exemplary embodiment, when the input image data for the pixel represents the gray level higher than or equal to the first reference gray level, the driver may generate the final image data for the pixel by compensating the input image data for the pixel by an equation "$RGBout=RGB*\{(1+Wd)^{(1/\gamma)}\}$", where $RGBout$ represents the final image data for the pixel, $RGB$ represents the input image data for the pixel, $Wd$ represents the determined compensation constant for the pixel, and $\gamma$ represents a gamma value of the display apparatus.

In an exemplary embodiment, the driver may generate the final image data representing a maximum gray level when the input image data for the pixel represents the gray level higher than or equal to a third reference gray level, and where the third reference gray level may be higher than the first reference gray level.

In an exemplary embodiment, the third reference gray level may be a minimum gray level of gray levels of the input image data that become higher than or equal to the maximum gray level after being compensated based on the determined compensation constant.

In an exemplary embodiment, the maximum gray level may be a 255-gray level.

In an exemplary embodiment, the driver may store compensation constant information for the determined compensation constant, and compensates the input image data based on the compensation constant information.

In an exemplary embodiment, the determined compensation constant may be determined based on a target luminance that is constant with respect to positions of the plurality of pixels and a real luminance that is changed depending on the positions of the plurality of pixels.

In an exemplary embodiment, the determined compensation constant for the pixel may be determined by an equation "Wd=Lt/Lr−1", where Wd represents the determined compensation constant for the pixel, Lt represents a target luminance of the pixel, and Lr represents a real luminance of the pixel.

In an exemplary embodiment, the determined compensation constant for the pixel may be increased as the position of the pixel becomes closer to an edge of the display panel.

In an exemplary embodiment, the display apparatus may be attached to at least one of other display apparatuses, and the at least one edge portion of the display panel may be adjacent to a bezel between the display panel of the display apparatus and a display panel of the at least one of the other display apparatuses.

In an exemplary embodiment, the display apparatus may be detachably attached to at least one other display apparatus.

An exemplary embodiment provides a display system including a plurality of partial display apparatuses arranged in a tile shape, and a host processor which divides source image data into a plurality of partial input image data respectively corresponding to the plurality of partial display apparatuses. Each of the plurality of partial display apparatuses includes a partial display panel including a plurality of pixels, and a driver which receives corresponding partial input image data among the plurality of partial input image data, generates partial final image data by compensating the corresponding partial input image data to increase luminances of pixels disposed in at least one edge portion of the partial display panel among the plurality of pixels, and drives the partial display panel based on the partial final image data. In each of the plurality of partial display apparatuses, the corresponding partial input image data for a pixel of the pixels is compensated based on a compensation constant determined according to a position of the pixel when the corresponding partial input image data for the pixel represents a gray level higher than or equal to a first reference gray level, and is compensated based on a reduced compensation constant that is reduced from the determined compensation constant when the corresponding partial input image data for the pixel represents the gray level lower than the first reference gray level.

An exemplary embodiment provides a display system including a plurality of partial display apparatuses arranged in a tile shape, and a host processor which divides source image data into a plurality of partial input image data respectively corresponding to the plurality of partial display apparatuses, generates a plurality of partial final image data by compensating the plurality of partial input image data to increase luminances of pixels disposed in at least one edge portion of a partial display panel of each of the plurality of partial display apparatuses, and provides the plurality of partial final image data to the plurality of partial display apparatuses, respectively. In the host processor, each of the plurality of partial input image data for a pixel of the pixels is compensated based on a compensation constant determined according to a position of the pixel when the each of the plurality of partial input image data for the pixel represents a gray level higher than or equal to a first reference gray level, and is compensated based on a reduced compensation constant that is reduced from the determined compensation constant when the each of the plurality of partial input image data for the pixel represents the gray level lower than the first reference gray level.

As described above, a display apparatus and a display system in an exemplary embodiment may improve a phenomenon of luminance decrease in at least one edge portion of a display panel by compensating image data, considering a decreasing ratio of luminance of the edge portion of the display panel. Further, a reduced compensation constant lower than a compensation constant that is determined according to a pixel position may be used with respect to input image data representing a gray level lower than a reference gray level, and thus a phenomenon that a whitish block occurs in the edge portion adjacent to a bezel due to excessive compensation for a low gray image may be prevented.

BRIEF DESCRIPTION OF THE DRAWINGS

Illustrative, non-limiting exemplary embodiments will be more clearly understood from the following detailed description in conjunction with the accompanying drawings.

FIG. 11 is a flowchart illustrating an exemplary embodiment of a method for compensating decrease of luminance.

12B is a diagram illustrating an example of a phenomenon that whitish blocks occur in edge portions adjacent to a bezel due to excessive compensation for a low gray image.

Figure 13:
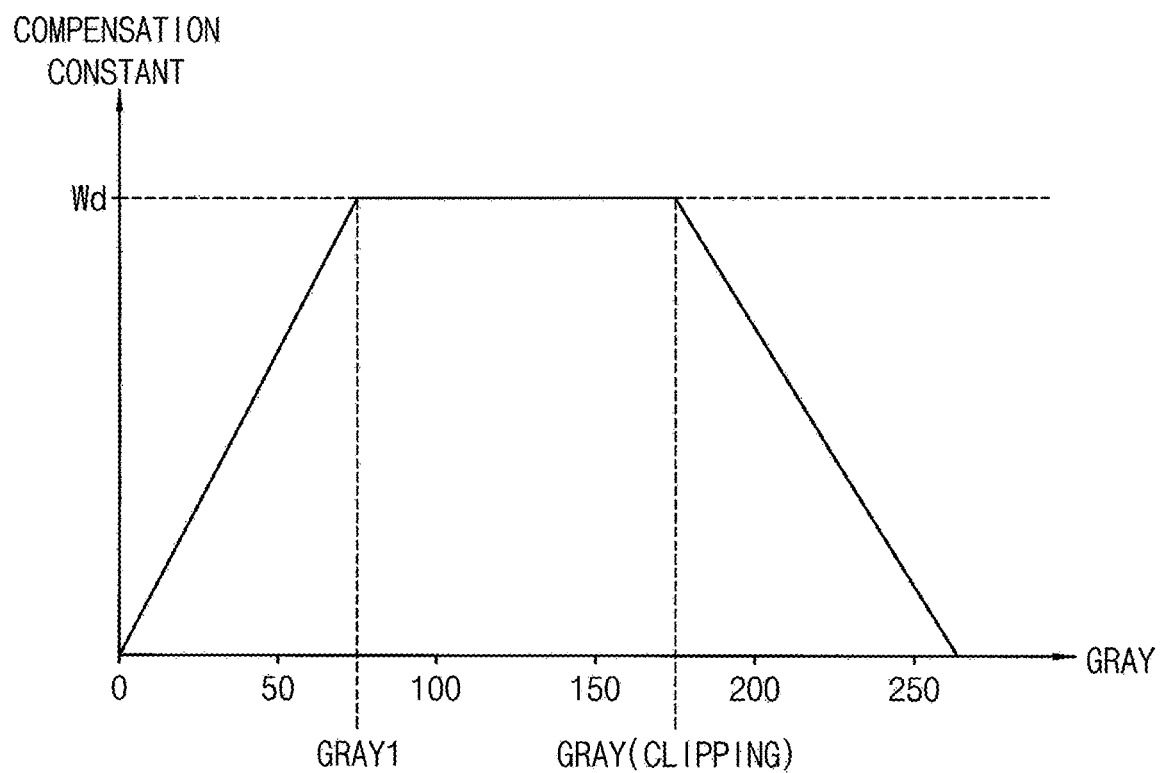

FIG. 13 is a graph illustrating an example of compensation constants used in a method of FIG. 11.

Figure 14:
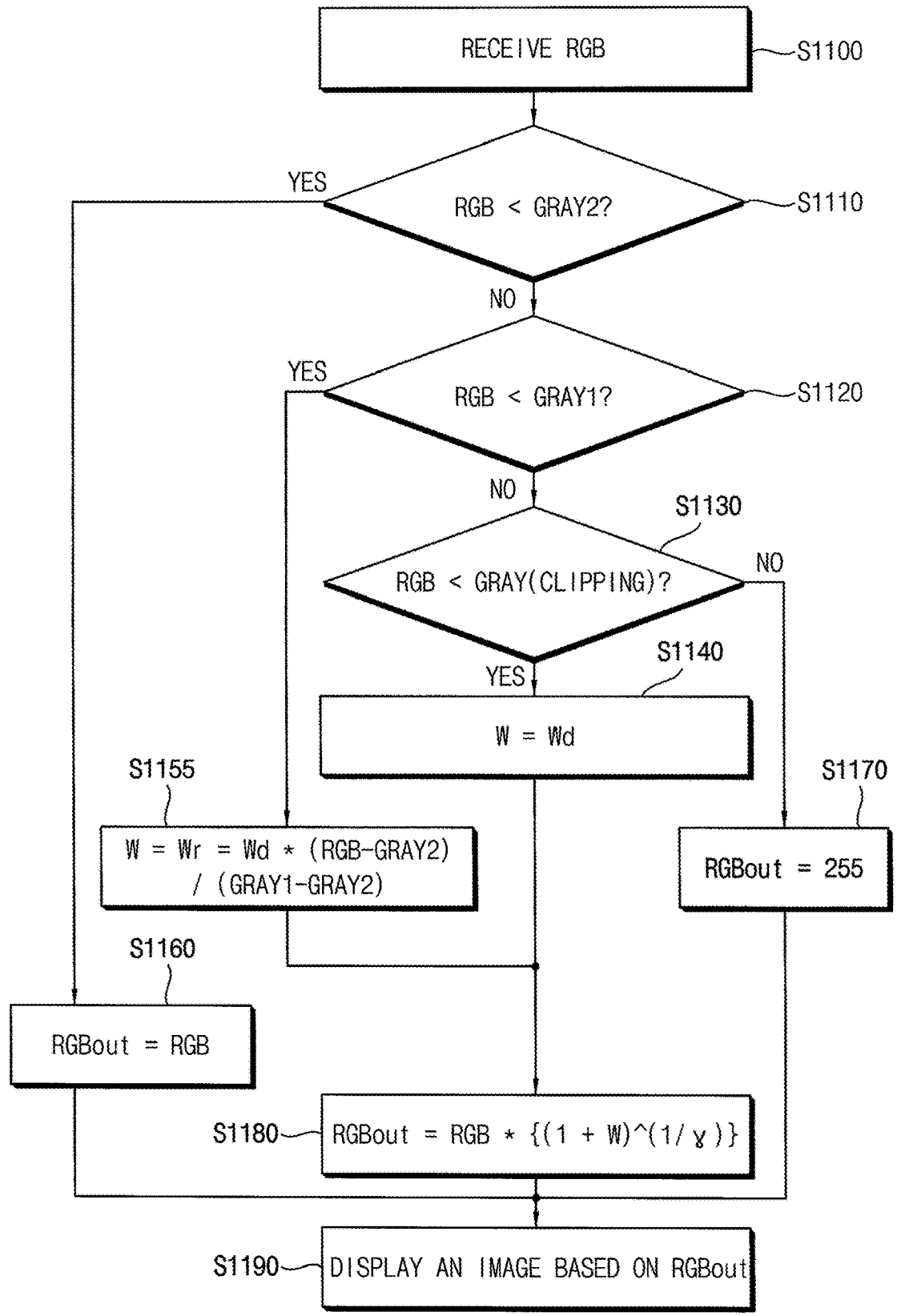

FIG. 14 is a flowchart illustrating an exemplary embodiment of a method for compensating decrease of luminance.

Figure 15:
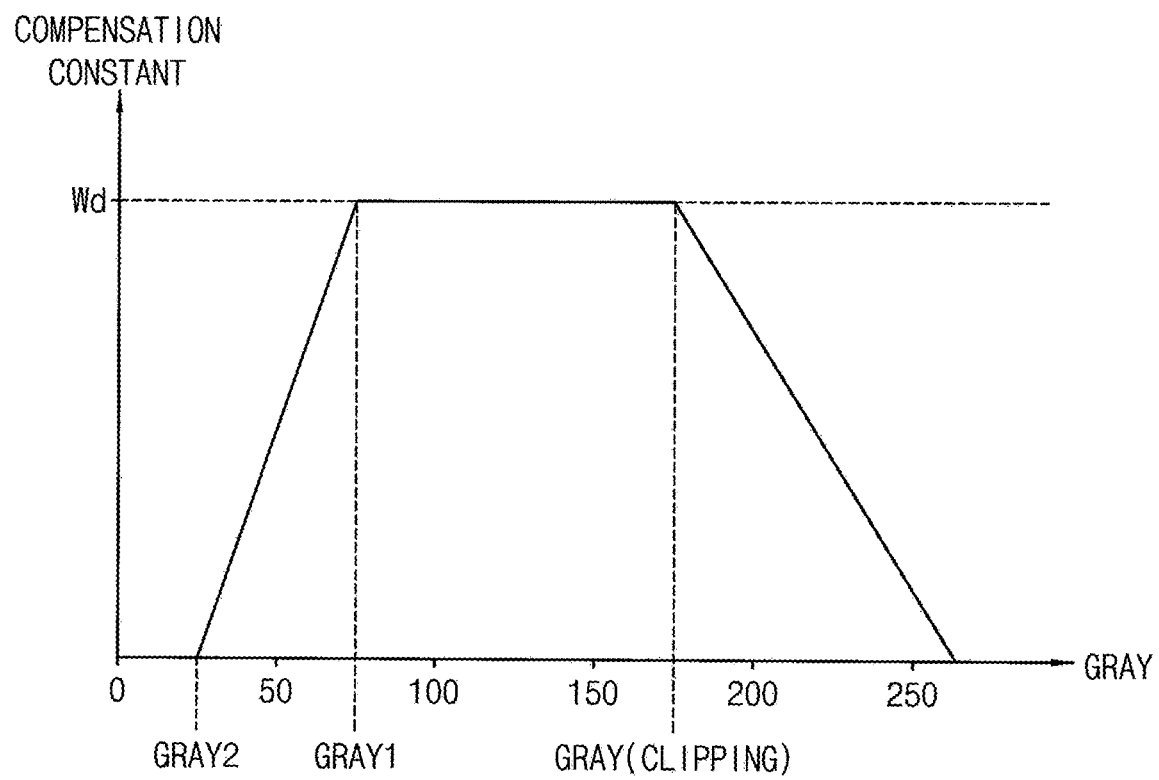

FIG. 15 is a graph illustrating an example of compensation constants used in a method of FIG. 14.

Figure 16:
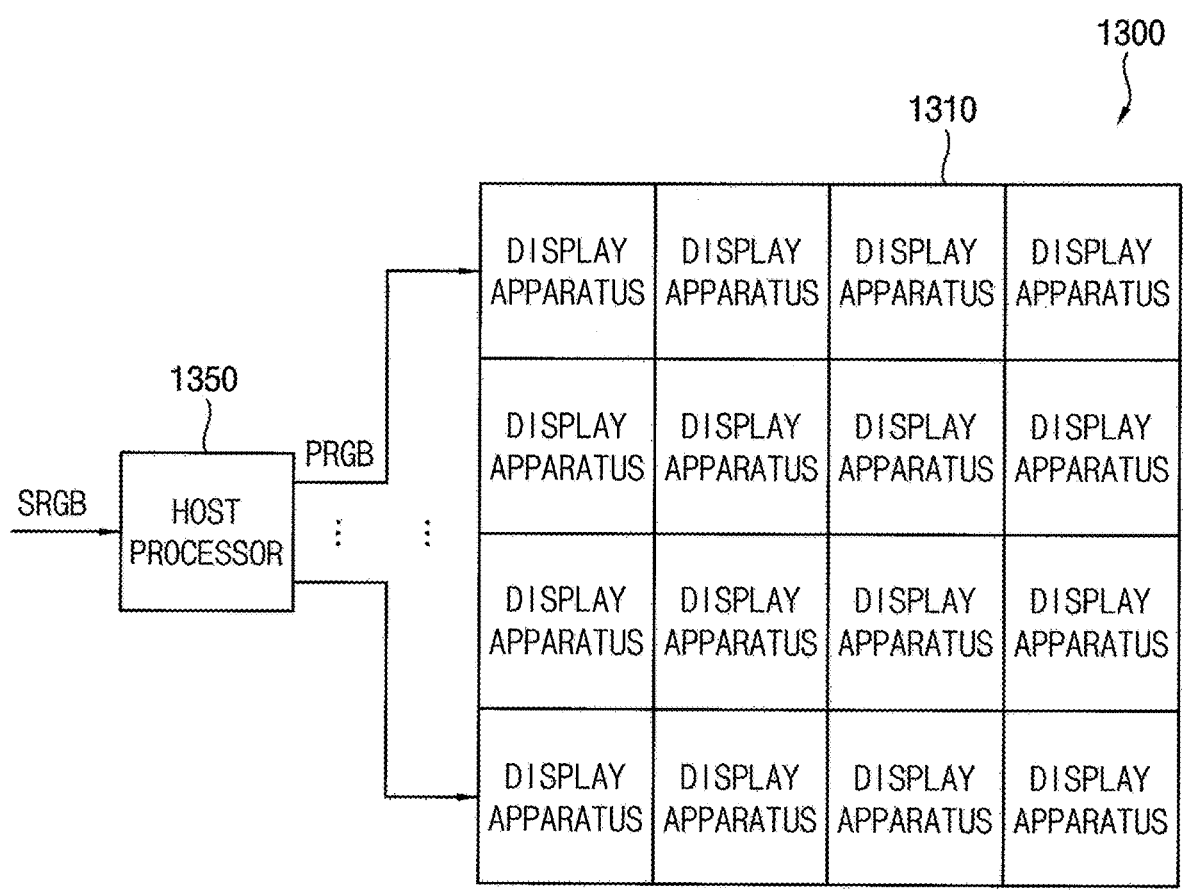

FIG. 16 is a block diagram illustrating an exemplary embodiment of a display system.

Figure 17:
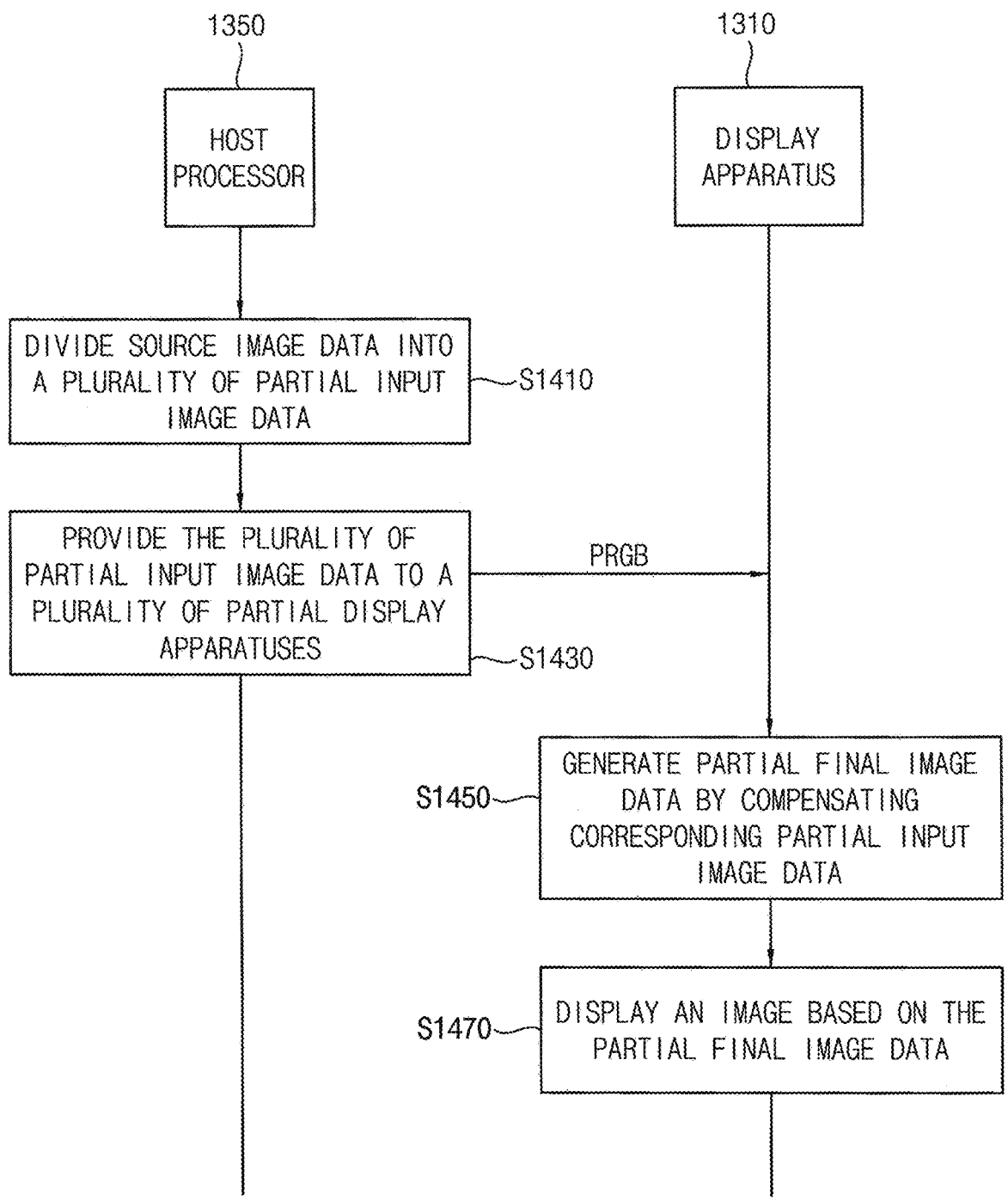

FIG. 17 is a flowchart illustrating an exemplary embodiment of an operation of a display system.

Figure 18:
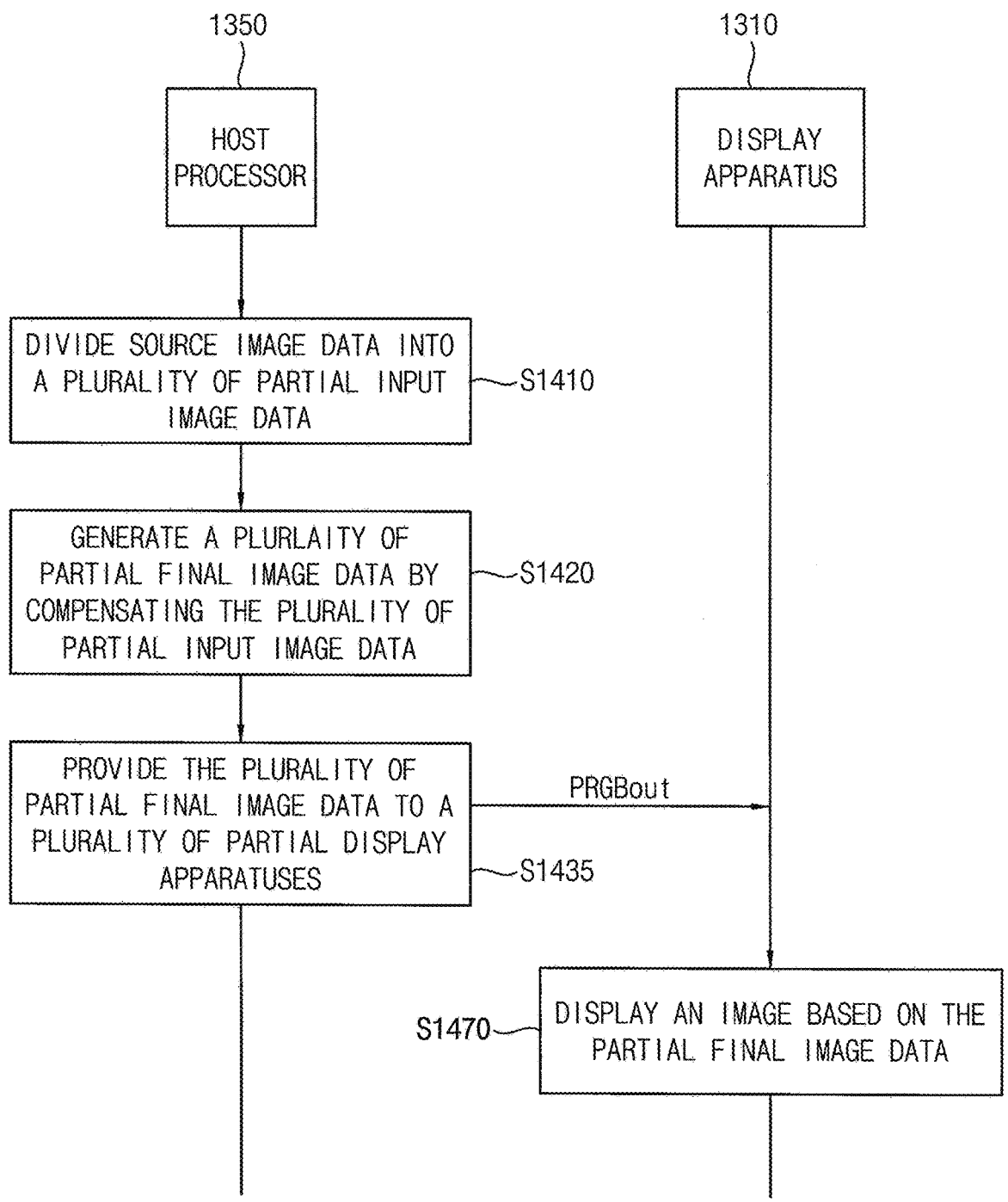

FIG. 18 is a flowchart illustrating another exemplary embodiment of an operation of a display system.

DETAILED DESCRIPTION

Hereinafter, embodiments of the invention will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
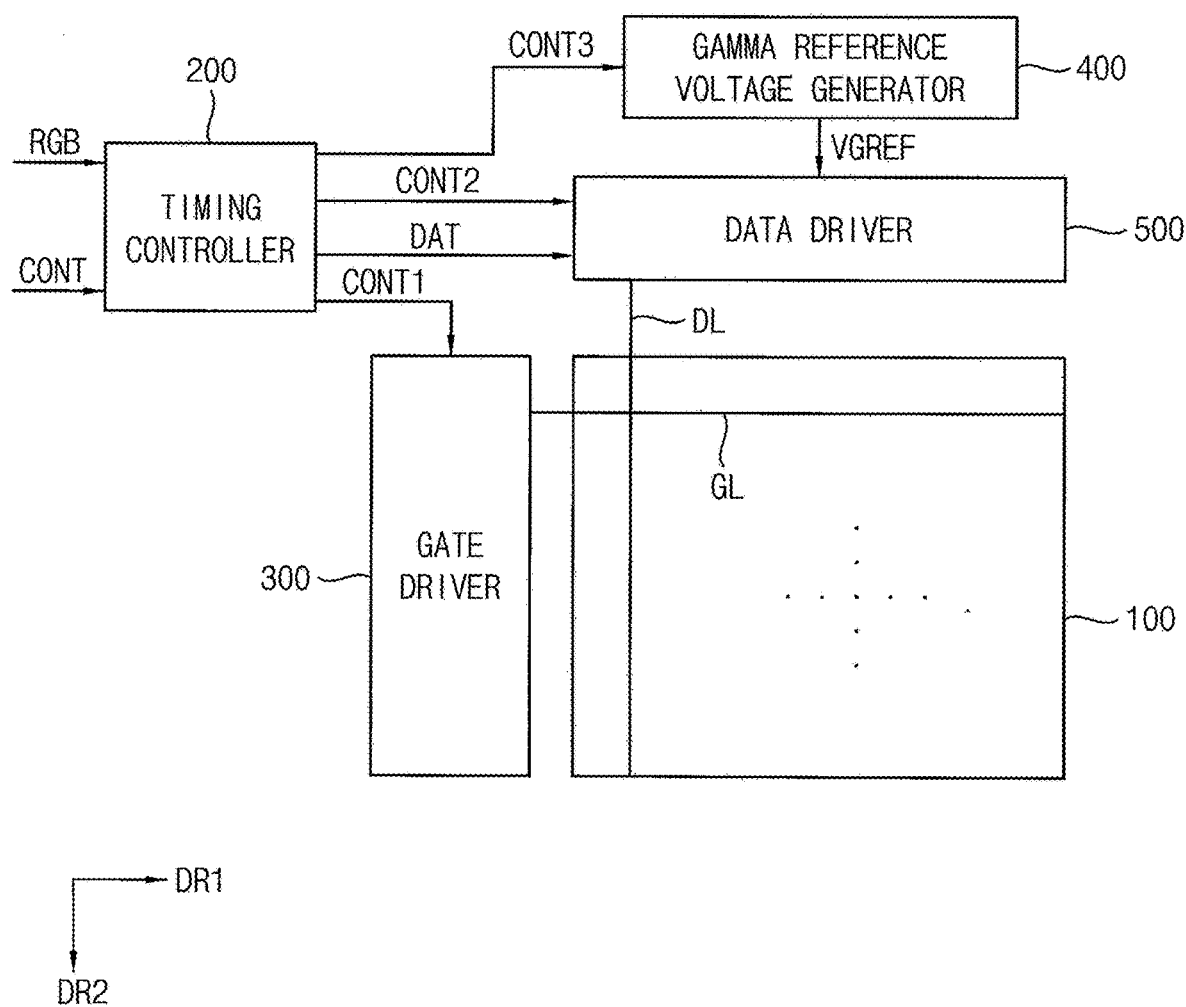
FIG. 1 is a block diagram illustrating an exemplary embodiment of a display apparatus.

FIG. 1 is a block diagram illustrating an exemplary embodiment of a display apparatus.

Referring to FIG. 1, a display apparatus may include a display panel 100 and a driver. The driver may include a timing controller 200, a gate driver 300, a gamma reference voltage generator 400, and a data driver 500.

The display panel 100 may include a display area that displays an image and a peripheral area disposed adjacent to the display area.

The display panel 100 may include a plurality of gate lines GL, a plurality of data lines DL, and a plurality of pixels electrically coupled to the gate lines GL and the data lines DL. The gate lines GL may extend in a first direction DR1, and the data lines DL may extend in a second direction DR2 crossing the first direction DR1.

In some exemplary embodiments, each pixel may include a switching element (not shown), a liquid crystal capacitor (not shown) and a storage capacitor (not shown). The liquid crystal capacitor and the storage capacitor may be electrically connected to the switching element. In other exemplary embodiments, each pixel may include at least one capacitor and at least two transistors. In some exemplary embodiments, the pixels may be arranged in a matrix configuration, but the arrangement of the pixels may not be limited to the matrix configuration. In other exemplary embodiments, the pixels (or sub-pixels) may be arranged in various other shapes such as a diamond shape, for example.

Each of the pixels may include a plurality of sub-pixels. In some exemplary embodiments, each pixel may have a RGB pixel structure including a red sub-pixel, a green sub-pixel and a blue sub-pixel, but the structure of each pixel may not be limited to the RGB pixel structure. In other exemplary embodiments, each pixel may have a RGBG pixel structure including a red sub-pixel, a first green sub-pixel, a blue sub-pixel and a second green sub-pixel, for example. In still other exemplary embodiments, in addition to the red, green and blue sub-pixels, or instead of the red, green and blue sub-pixels, each pixel may include a yellow sub-pixel, a cyan sub-pixel, a magenta sub-pixel, or the like.

In some exemplary embodiments, the pixels disposed in an edge portion of a display panel or a display area may include a white sub-pixel.

The structure of the pixels will be explained in detail with reference to FIGS. 3 and 9.

The timing controller 200 may receive input image data RGB and an input control signal CONT from an external device (e.g., a host processor). The input image data RGB may be also referred to as an input image signal. The input image data RGB may include red image data, green image data and blue image data or may be one of the red image data, the green image data and the blue image data depending on a scope of target pixel. In some exemplary embodiments, each of the red image data, green image data, and the blue image data may represent a gray level from 0 to 255, or have a value of 0 to 255 grayscale. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and a data signal DAT based on the input image data RGB and the input control signal CONT.

The timing controller 200 may generate the first control signal CONT1 for controlling operations of the gate driver 300 based on the input control signal CONT, and may output the first control signal CONT1 to the gate driver 300. The first control signal CONT1 may include a vertical start signal and a gate clock signal.

The timing controller 200 may generate the second control signal CONT2 for controlling operations of the data driver 500 based on the input control signal CONT, and may output the second control signal CONT2 to the data driver 500. The second control signal CONT2 may include a horizontal start signal and a load signal.

The timing controller 200 may generate the data signal DAT based on the input image data RGB. The timing controller 200 may output the data signal DAT to the data driver 500. The data signal DAT may be substantially the same image data as the input image data RGB or the data signal DAT may be compensated image data generated by compensating the input image data RGB. In an exemplary embodiment, for example, the timing controller 200 may selectively perform an image quality compensation, a spot compensation, an adaptive color correction ("ACC"), and/or a dynamic capacitance compensation ("DCC") on the input image data RGB to generate the data signal DAT.

Specially, the timing controller 200 may compensate the input image data RGB in order to compensate a luminance decrease in the edge portion of the screen (or in order to increase luminances of the pixels disposed in at least one edge portion of the display area of the display panel 100). In this case, the timing controller 200 may generate the data signal DAT based on the compensated input image data.

The compensation of the input image data RGB will be explained in detail with reference to FIGS. 3 through 6, 9, and 10 through 15.

The timing controller 200 may generate the third control signal CONT3 for controlling operations of the gamma reference voltage generator 400 based on the input control signal CONT, and may output the third control signal CONT3 to the gamma reference voltage generator 400.

The gate driver 300 may generate gate signals for driving the gate lines GL in response to the first control signal CONT1 received from the timing controller 200. The gate driver 300 may sequentially output the gate signals to the gate lines GL.

In some exemplary embodiments, the gate driver 300 may be directly disposed (e.g., mounted) on the display panel 100, or may be connected to the display panel 100 as a tape carrier package ("TCP") type, for example. In an alternative exemplary embodiment, the gate driver 300 may be integrated on the peripheral region of the display panel 100.

The gamma reference voltage generator 400 may generate a gamma reference voltage VGREF in response to the third control signal CONT3 received from the timing controller 200. The gamma reference voltage generator 400 may output the gamma reference voltage VGREF to the data driver 500. The level of the gamma reference voltage VGREF corresponds to grayscales of a plurality of pixel data included in the data signal DAT.

In some exemplary embodiments, the gamma reference voltage generator 400 may be disposed in the timing controller 200, or may be disposed in the data driver 500.

The data driver 500 may receive the second control signal CONT2 and the data signal DAT from the timing controller 200, and may receive the gamma reference voltage VGREF from the gamma reference voltage generator 400. The data driver 500 may convert the data signal DAT to data voltages having analogue levels based on the gamma reference voltage VGREF. The data driver 500 may output the data voltages to the data lines DL.

In some exemplary embodiments, the data driver 500 may be directly disposed (e.g., mounted) on the display panel 100, or may be connected to the display panel 100 as the TCP type, for example. In an alternative exemplary embodiment, the data driver 500 may be integrated on the peripheral region of the display panel 100.

Figure 2:
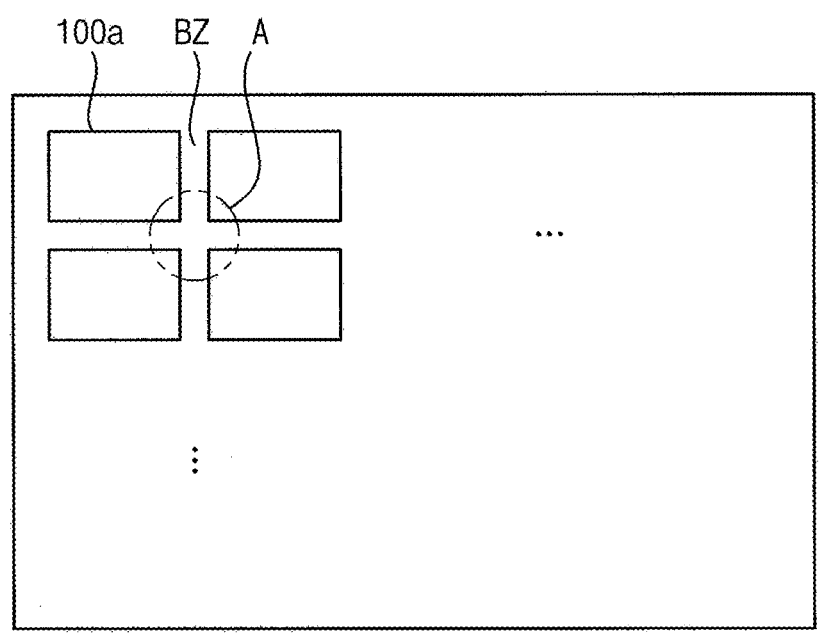
FIG. 2 is a diagram illustrating an exemplary embodiment of a screen of a tiled-display apparatus formed with a plurality of (partial) display apparatuses.

FIG. 2 is a diagram illustrating an exemplary embodiment of a screen of a tiled-display apparatus formed with a plurality of (partial) display apparatuses. The tiled display apparatus may be a substantially large display apparatus in which the plurality of (partial) display apparatuses is integrated in order to display ultra-high resolution image.

Referring to FIGS. 1 and 2, the display apparatus of FIG. 1 may be one of the plurality of (partial) display apparatuses that may be included in the tiled display apparatus in an exemplary embodiment. In this case, the display panel 100 included in the display apparatus in an exemplary embodiment may correspond to one of a plurality of partial screens included in a screen of the tiled display apparatus. That is, the display panel 100 may be one of partial display panels 100a of the tiled display apparatus.

A bezel BZ may be disposed between the partial display panels 100a of the tiled display apparatus. The user may perceive an entire screen of the tiled display apparatus as one display apparatus. Thus, the image quality of the tiled display apparatus may improve as the bezel BZ is thinner.

Figure 3:
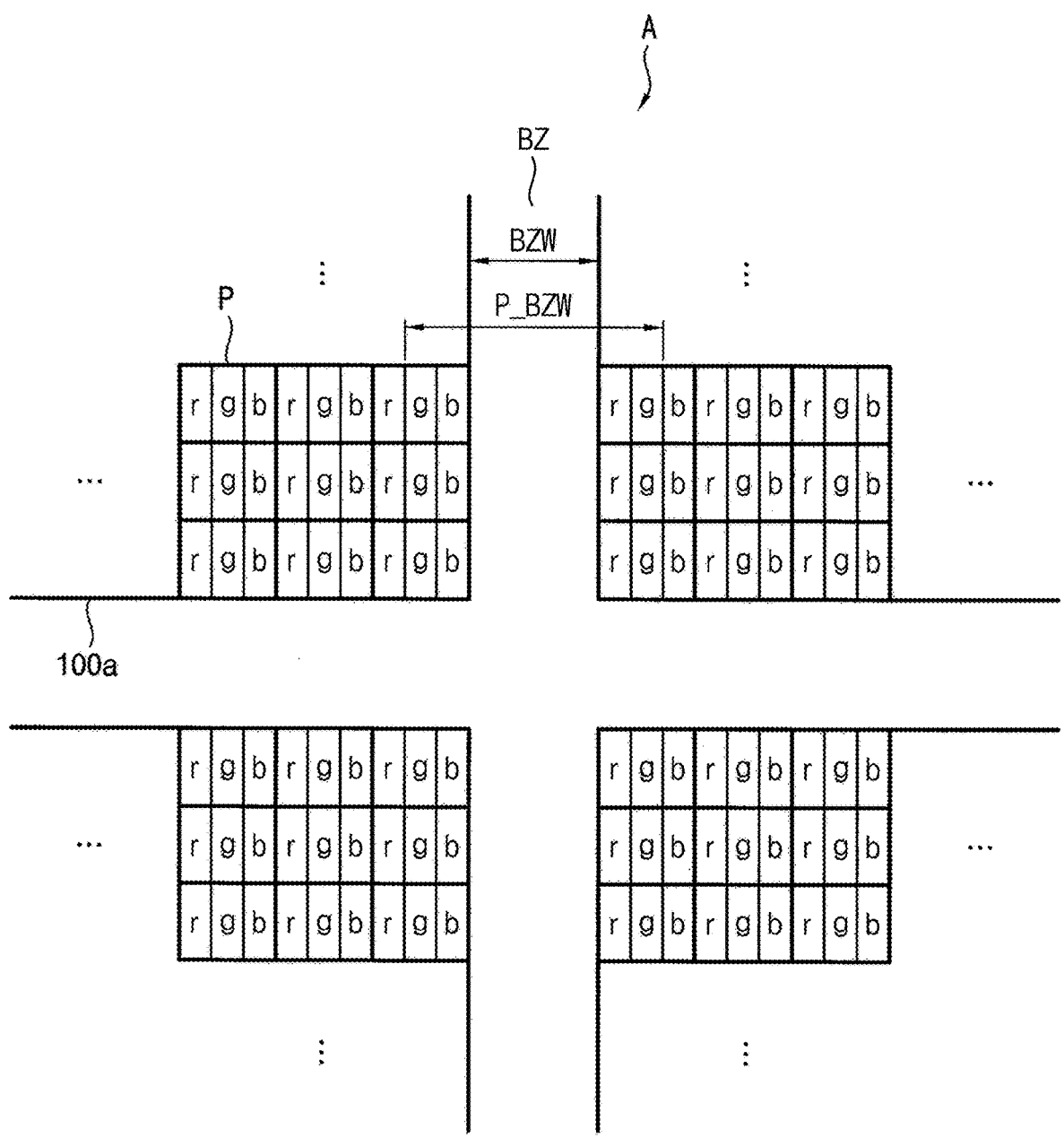
FIG. 3 is an enlarged diagram illustrating portion A of FIG. 2.

FIG. 3 is an enlarged diagram illustrating portion A of FIG. 2.

Referring to FIGS. 1 through 3, the partial display panel 100a may include a plurality of pixels. Each pixel P may include a plurality of sub-pixels. In an exemplary embodiment, each pixel P may include a red sub-pixel r, a green sub-pixel g, and a blue sub-pixel b, for example.

The other partial display panels included in the tiled display apparatus may be substantially the same as the partial display panel 100a of FIG. 3.

The bezel BZ may be a space between the partial display panels 100a. The pixels may not be disposed in the bezel BZ. That is, the image may not be displayed on the bezel BZ.

A bezel width BZW may be a real width of the bezel BZ. The bezel width BZW may be a fixed value and may not be changed once the tiled display apparatus is manufactured.

A perception bezel width P_BZW may be a width of a space that the user perceives as the bezel BZ. The perception bezel width P_BZW may increase as edge portions of the partial display panels 100a of the tiled display apparatus are darker. In most cases, the perception bezel width P_BZW may be wider than the bezel width BZW. In an exemplary embodiment, the pixels disposed in a center portion of a display area of each partial display panel 100a may receive light from backlight sources in four directions (i.e., in upward, downward, leftward and rightward directions), but the pixels disposed in edge portions surrounding the center portion within the display area of each partial display panel 100a may not receive the light from the backlight sources in at least one of the four directions, for example. Thus, the pixels disposed in the edge portions may have luminances lower than those of the pixels disposed in the center portion. Accordingly, the edge portions of the display area of each partial display panel 100a may be darker than the center portion of the display area of each partial display panel 100a, and thus the perception bezel width P_BZW may be wider than the bezel width BZW.

The display quality of the tiled display apparatus may improve by decreasing the perception bezel width P_BZW. The perception bezel width P_BZW may be changed according to a property of the image displayed on the partial display panels 100a even after the tiled display apparatus is manufactured.

In other exemplary embodiments, the display apparatus of FIG. 1 may be a single display apparatus rather than a part of the tiled display apparatus, although not shown.

Figure 4:
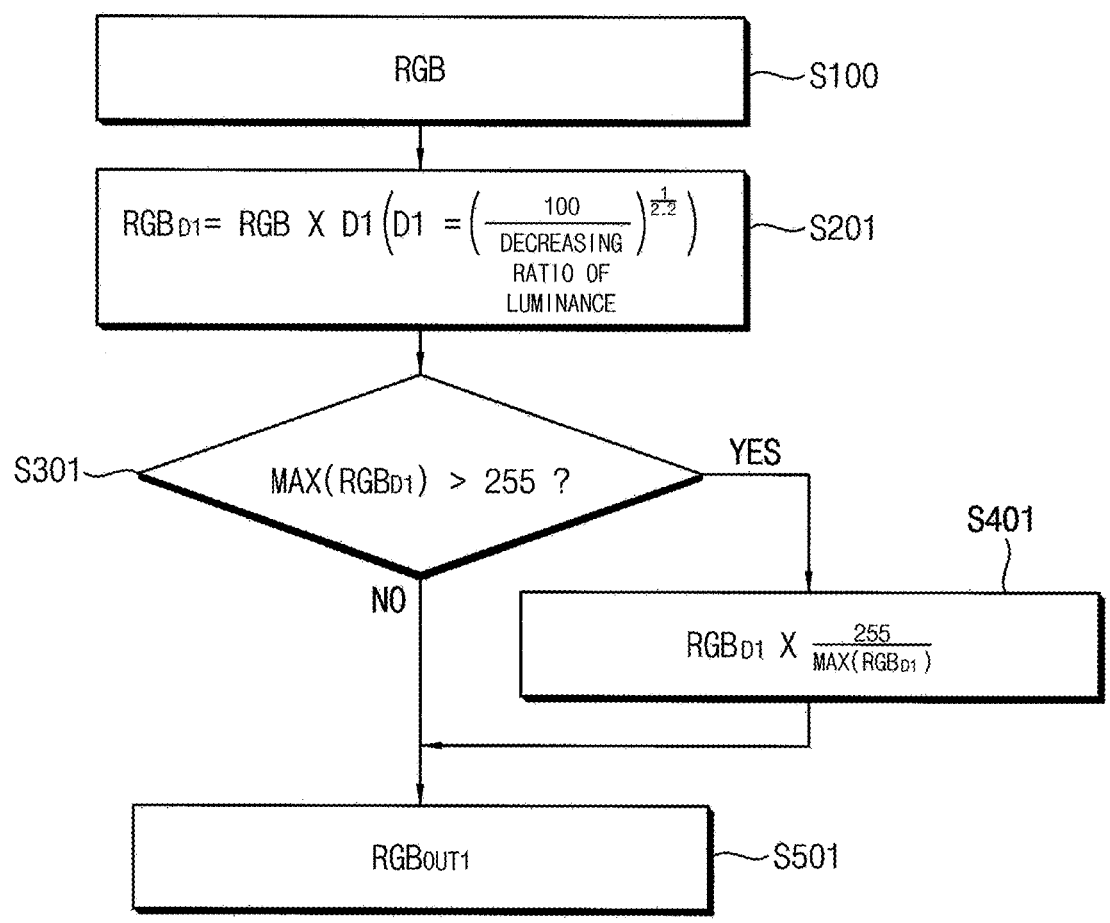
FIG. 4 is a flowchart illustrating an exemplary embodiment of a method for compensating decrease of luminance.
Figure 5:
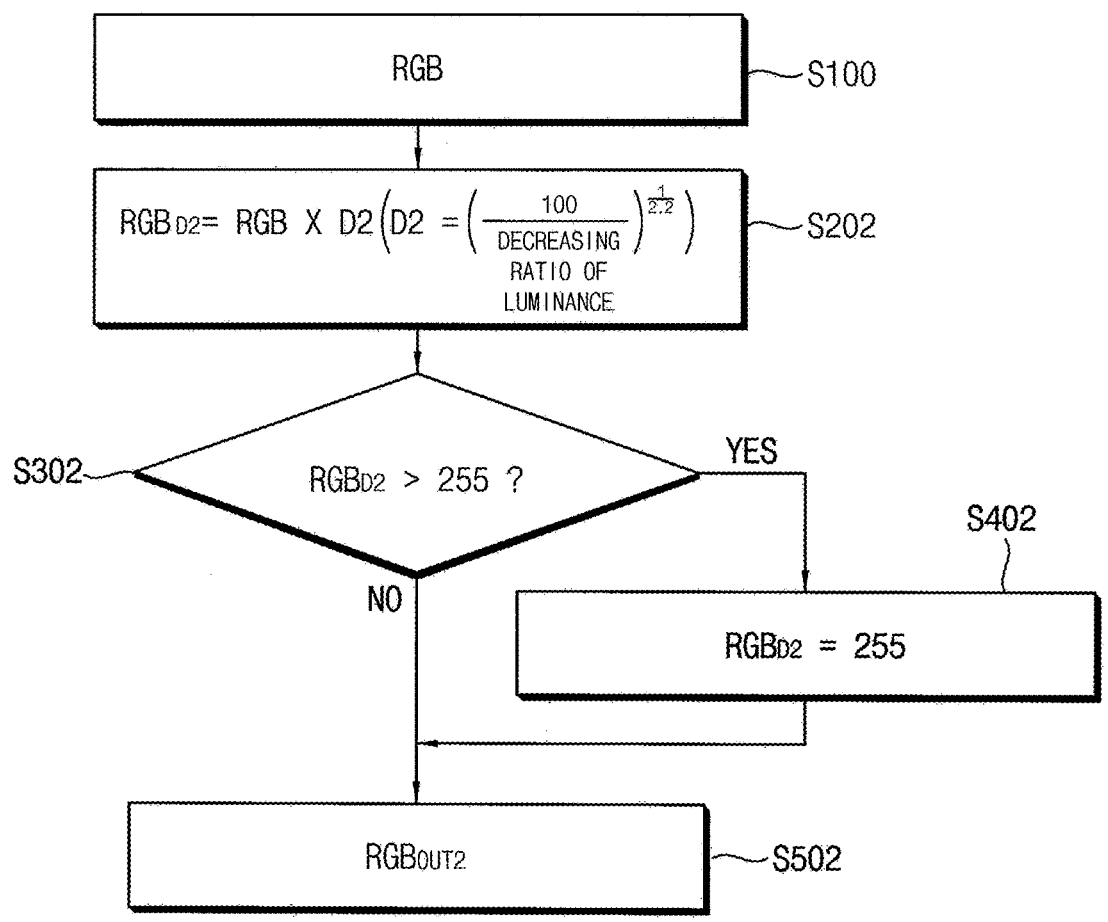
FIG. 5 is a flowchart illustrating an exemplary embodiment of a method for compensating decrease of luminance.
Figure 6:
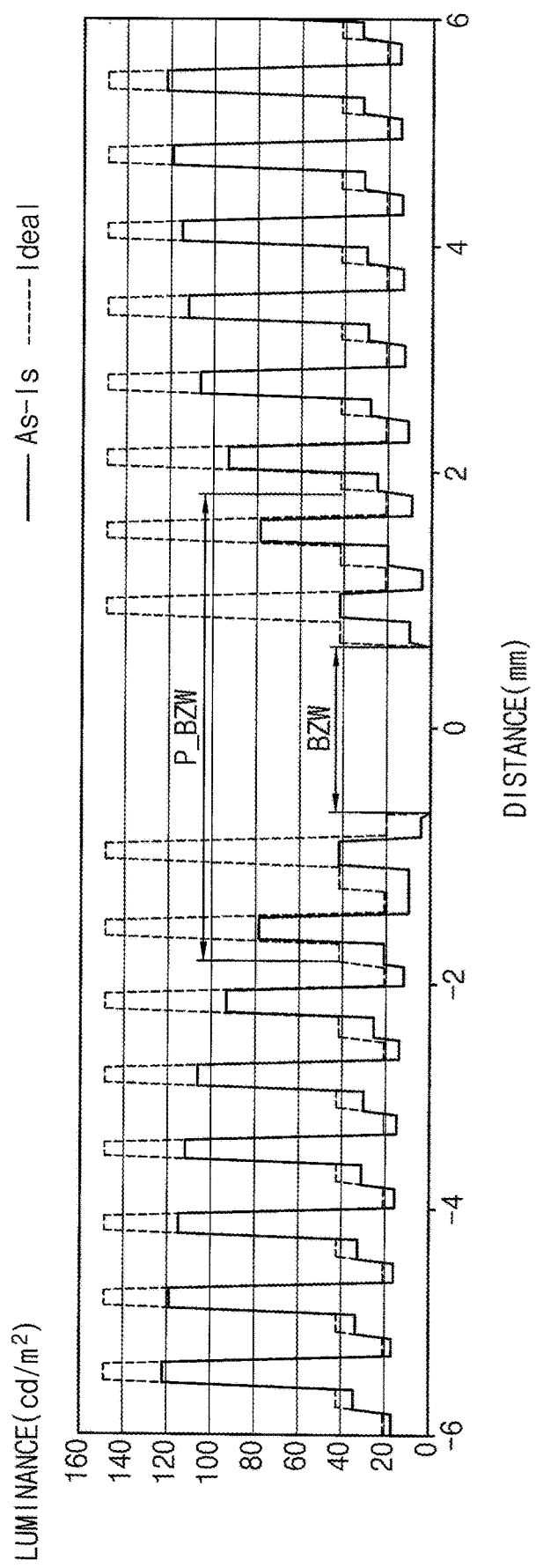
FIG. 6 is a graph illustrating an example of luminance of edge portions of adjacent (partial) display apparatuses according to a distance from a center of a bezel.

FIG. 4 is a flowchart illustrating an exemplary embodiment of a method for compensating decrease of luminance, FIG. 5 is a flowchart illustrating an exemplary embodiment of a method for compensating decrease of luminance, and FIG. 6 is a graph illustrating an example of luminance of edge portions of adjacent (partial) display apparatuses according to a distance from a center of a bezel.

Specifically, FIG. 6 is a graph illustrating luminance, in terms of candela per square meter (cd/m$^2$), of pixels in edge portions of a partial display panel versus a distance, in terms of millimeter (mm), from a center of the bezel to calculate a decreasing ratio of luminance in methods of FIGS. 4 and 5.

Referring to FIGS. 1 through 3 and FIG. 6, the luminance of the pixel in the edge portion of the partial display panel may be uniform in an ideal case (Ideal). However, the luminance of the pixel in the edge portion of the partial display panel may decrease before applying a method for compensating decrease of luminance in an exemplary embodiment in a real case (As-Is).

The decreasing ratio of luminance may be a ratio (in percentage) of luminance in a real case (real luminance) to luminance in the ideal case (target luminance).

That is, the decreasing ratio of luminance may satisfy Equation 1.

$$\text{decreasing ratio of luminance} = \frac{\text{real luminance}}{\text{target luminance}} * 100 \qquad \langle\text{Equation 1}\rangle$$

Here, the target luminance may be uniform or constant with respect to positions of the pixels, and the real luminance may be changed depending on the positions of the pixels, and may be measured. In some exemplary embodiments, the target luminance may be determined based on desired luminances of backlight sources included in a display apparatus at the positions of the respective pixels, and the desired luminances of backlight sources may be uniform or constant with respect to the positions of the pixels. The real luminance may be measured luminances of the backlight sources at the positions of the respective pixels, and the measured luminances of the backlight sources may be decreased as the position of each pixel becomes closer to an edge of the partial display panel. In other exemplary embodiments, the target luminance may be desired luminances of the respective pixels when input image data representing a predetermined gray level (e.g., a 255-gray level), and the desired luminances of the respective pixels may be uniform or constant with respect to the positions of the pixels. The real luminance may be measured luminances of the respective pixels at the positions of the respective pixels, and the measured luminances of the respective pixels may be decreased as the position of each pixel becomes closer to the edge of the partial display panel.

The decreasing ratio of luminance may have a value of 0 to 100. The decreasing ratio of luminance may be dependent on the property of the partial display panel 100a (or an arrangement of the backlight sources). A difference of the real luminance and the target luminance may increase as the decreasing ratio of luminance decreases. The decreasing ratio of luminance may decrease toward the edge of the partial display panel 100a when the method for compensating decrease of luminance is not applied. Specifically, the decreasing ratios of luminance of the sub-pixels included in the same pixel P may be different from each other. In an exemplary embodiment, for example, the decreasing ratio of luminance of a first sub-pixel disposed relatively close to the edge of the partial display panel 100a may be less than the decreasing ratio of a second sub-pixel relatively distant from the edge of the partial display panel 100a, although the first and second sub-pixels are included in the same pixel P.

The perception bezel width P_BZW may increase as the decreasing ratio of luminance in the edge portion of the partial display panel 100a decreases. That is, it is preferable to increase the decreasing ratio of luminance in the edge portion of the partial display panel 100a in order to improve the display quality of the display apparatus.

The decreasing ratio of luminance of the pixels in the edge portions of the partial display panel 100a may be stored in the timing controller 200. In an exemplary embodiment, the decreasing ratio of luminance may be stored based on the graph of FIG. 6, for example.

Referring to FIGS. 1, 2, 3, 4, and 6, the timing controller 200 may generate the compensation image data $RGB_{D1}$ based on the input image data RGB and the corresponding decreasing ratio of luminance (S201). The decreasing ratio of luminance of all sub-pixels in the same pixel P may be the same. The timing controller 200 may generate the compensation image data $RGB_{D1}$ using Equation 2.

$$RGB_{D1} = RGB * D1, \quad \text{(Equation 2)}$$

where $$D1 = \left(\frac{100}{\text{decreasing ratio of luminance}}\right)^{\frac{1}{\alpha}},$$

and α is a gamma value.

Here, the input image data RGB may represent an input red gray level, an input green gray level, and an input blue gray level, and the compensation image data $RGB_{D1}$ may represent a compensated red gray level, a compensated green gray level, and a compensated blue gray level. In an exemplary embodiment, each component of the input image data RGB may have a value of 0 to 255 grayscale, for example. In an exemplary embodiment, the value D1 may vary depending on the pixel P, and the value D1 may be commonly applied to the sub-pixels in the same pixel P.

In an exemplary embodiment, the timing controller 200 may receive the input image data RGB representing a first red gray level, a first green gray level, and a first blue gray level for a first pixel and may generate the compensation image data $RGB_{D1}$ having a first compensated red gray level, a first compensated green gray level, and a first compensated blue gray level, for example. The value D1 may be commonly applied to the sub-pixels included in the first pixel. The timing controller 200 may receive the input image data RGB having a second red gray level, a second green gray level, and a second blue gray level for a second pixel that is different from the first pixel and may generate the compensation image data $RGB_{D1}$ having a second compensated red gray level, a second compensated green gray level, and a second compensated blue gray level. A value D1 that is different from the value D1 of the first pixel may be commonly applied to the sub-pixels included in the second pixel.

The timing controller 200 may compare a greatest compensated gray level $MAX(RGB_{D1})$ to a 255-gray level, where the greatest compensated gray level $MAX(RGB_{D1})$ is the greatest value among the sub-pixels' compensated gray levels in the compensation image data $RGB_{D1}$ of the each pixel P (S301).

When the greatest compensated gray level $MAX(RGB_{D1})$ is greater than the 255-gray level, the timing controller 200 may adjust the compensation image data $RGB_{D1}$ of the pixel P using Equation 3, and the adjusted result may correspond to the final image data $RGB_{OUT1}$ (S401).

$$RGB_{OUT1} = RGB_{D1} * (255/MAX(RGB_{D1})) \quad \text{<Equation 3>}$$

When the greatest compensated gray level $MAX(RGB_{D1})$ is equal to or less than the 255-gray level, the compensation image data $RGB_{D1}$ may correspond to the final image data $RGB_{OUT1}$ without further compensation or adjustment. That is, the timing controller 200 may output the compensation image data $RGB_{D1}$ as the final image data $RGB_{OUT1}$.

In an exemplary embodiment, for example, when the red gray level of the input image data RGB of the first pixel is 200, the green gray level of the input image data RGB of the first pixel is 150, the blue gray level of the input image data RGB of the first pixel is 100, and the decreasing ratio of luminance is 50, the value D1 of the first pixel may be about 1.37. In this case, the red gray level of the compensation image data $RGB_{D1}$ of the first pixel may be about 274, the green gray level of the compensation image data $RGB_{D1}$ of the first pixel may be about 206, and the blue gray level of the compensation image data $RGB_{D1}$ of the first pixel may be about 137. In this case, the red gray level of the final image data $RGB_{OUT1}$ of the first pixel may be 255, the green gray level of the final image data $RGB_{OUT1}$ of the first pixel may be 192, the blue gray level of the final image data $RGB_{OUT1}$ of the first pixel may be 128 because the greatest compensated gray level $MAX(RGB_{D1})$ of the first pixel is 274 which is greater than 255, thereby the compensation image data $RGB_{D1}$ may be rescaled.

The timing controller 200 may generate the data signal DAT based on the final image data $RGB_{OUT1}$ and may output the data signal DAT to the data driver 500 (S501).

When the greatest compensated gray level $MAX(RGB_{D1})$ in each pixel is greater than the 255-gray level, color distortions almost do not occur because all sub-pixels in the pixel are clipped in the same ratio.

Referring to FIGS. 1, 2, 3, 5, and 6, in another exemplary embodiment, the timing controller 200 may generate the compensation image data $RGB_{D2}$ based on the input image data RGB and the corresponding decreasing ratio of luminance (S202). The decreasing ratios of luminance of sub-pixels in the same pixel P may be different from each other. The timing controller 200 may generate the compensation image data $RGB_{D2}$ using Equation 4.

$$RGB_{D2} = RGB * D2, \quad \text{(Equation 4)}$$

where $$D2 = \left(\frac{100}{\text{decreasing ratio of luminance}}\right)^{\frac{1}{\alpha}},$$

and α is a gamma value.

Here, the input image data RGB may represent one of an input red gray level, an input green gray level and an input blue gray level, and the compensation image data $RGB_{D2}$ may represent one of a compensated red gray level, a compensated green gray level and a compensated blue gray level which corresponds to the input image data RGB. In an exemplary embodiment, the input image data RGB may have a value of 0 to 255 grayscale, for example. In an exemplary embodiment, the value D2 may vary depending on a pixel P and a sub-pixel thereof, and the sub-pixels in the same pixel P may have the values D2 different from each other.

In an exemplary embodiment, the timing controller 200 may receive the input image data RGB having one of a first red gray level, a first green gray level, and a first blue gray level, and may generate the compensation image data $RGB_{D2}$ having one of a first compensated red gray level, a first compensated green gray level and a first compensated blue gray level, which corresponds to the input image data RGB, for example. The values D2 different from each other according to the sub-pixels may be applied to the sub-pixels included in the first pixel. The timing controller 200 may receive the input image data RGB having one of a second red gray level, a second green gray level and a second blue gray level, and may generate the compensation image data $RGB_{D2}$ having one of a second compensated red gray level, a second compensated green gray level and a second compensated blue gray level. The sub-pixels included in the second pixel may have the values D2 different from each other.

The timing controller 200 may compare each of the compensation image data $RGB_{D2}$ of the sub-pixels to the 255-gray level (S302).

When the compensation image data $RGB_{D2}$ is greater than the 255-gray level, the timing controller 200 may adjust the compensation image data $RGB_{D2}$ of the sub-pixel to the 255-gray level, and the adjusted result, or the 255-gray level may correspond to the final image data $RGB_{OUT2}$.

In an exemplary embodiment, when the red gray level of the input image data RGB of the first pixel is 200, the green gray level of the input image data RGB of the first pixel is 150, the blue gray level of the input image data RGB of the first pixel is 100, the decreasing ratio of luminance of the red sub-pixel is 60, the decreasing ratio of luminance of the green sub-pixel is 50, and the decreasing ratio of luminance of the blue sub-pixel is 40, the value D2 of the red sub-pixel pixel may be about 1.26, the value D2 of the green sub-pixel may be about 1.37, and the value D2 of the blue sub-pixel may be about 1.52, for example. In this case, the red gray level of the compensation image data $RGB_{D2}$ of the first pixel may be about 252, the green gray level of the compensation image data $RGB_{D2}$ of the first pixel may be about 206, and the blue gray level of the compensation image data $RGB_{D2}$ of the first pixel may be about 152. In this case, the red gray level of the final image data $RGB_{OUT2}$ of the first pixel may be 252, the green gray level of the final image data $RGB_{OUT2}$ of the first pixel may be 206, the blue gray level of the final image data $RGB_{OUT2}$ of the first pixel may be 152.

The timing controller 200 may generate the data signal DAT based on the final image data $RGB_{OUT2}$ and may output the data signal DAT to the data driver 500 (S502).

In the exemplary embodiment, the decrease of luminance may be compensated in detail because the difference of the decreasing ratio of the luminance of the sub-pixels in the same pixel according to the position is considered.

Figures 7, 8:
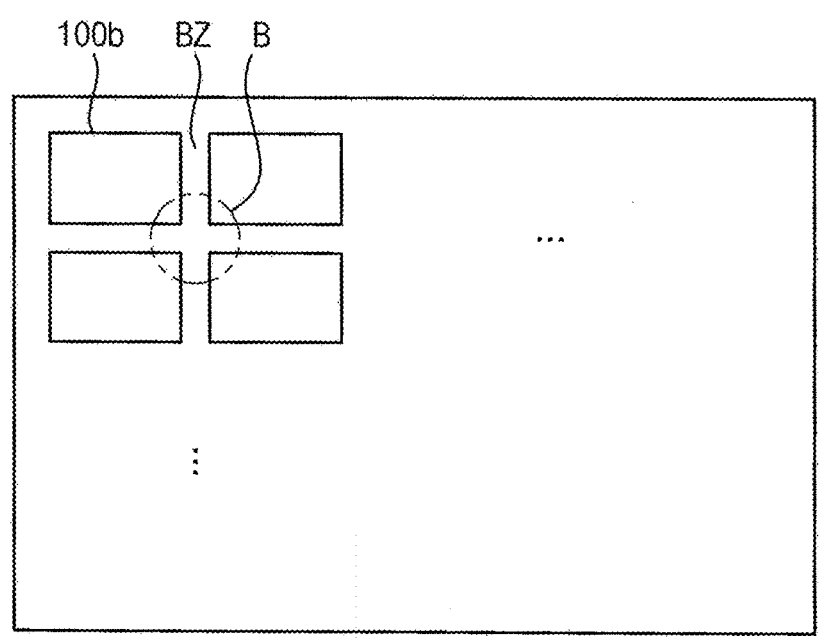
FIG. 7 is a table illustrating differences of perception bezel widths depending on whether an exemplary embodiment of a method for compensating decrease of luminance is applied to a display apparatus.
FIG. 8 is a diagram illustrating an exemplary embodiment of a screen of a tiled-display apparatus formed with a plurality of (partial) display apparatuses.

FIG. 7 is a table illustrating differences of perception bezel widths depending on whether an exemplary embodiment of a method for compensating decrease of luminance is applied to a display apparatus.

Referring to FIGS. 3 and 7, a model A is a display apparatus. A bezel width BZW of the model A may be about 2.30 mm, and a perception bezel width P_BZW(Ideal) of an ideal case may be about 2.33 mm. In a case that the exemplary embodiment of the invention is not applied, a perception bezel width P_BZW(As-Is) may be about 3.28 mm. In a case that the exemplary embodiment of the invention is applied, a perception bezel P_BZW may be about 2.76 mm. The perception bezel width decreases by about 0.52 mm in the case that the exemplary embodiment of the invention is applied compared to the case that the exemplary embodiment of the invention is not applied.

A model B is a display apparatus. A bezel width BZW of the model B may be about 1.49 mm, and a perception bezel width P_BZW(Ideal) of an ideal case may be about 1.48 mm. In a case that the exemplary embodiment of the invention is not applied, a perception bezel width P_BZW (As-Is) may be about 2.68 mm. In a case that the exemplary embodiment of the invention is applied, a perception bezel P_BZW may be about 1.95 mm. The perception bezel width decreases by about 0.73 mm in the case that the exemplary embodiment of the invention is applied compared to the case that the exemplary embodiment of the invention is not applied.

The luminance of the edge portion of the partial display panel may be compensated to be similar with the ideal luminance shown in the graph of FIG. 6 by compensating the input image data, considering the decreasing ratio of luminance of the pixels or sub-pixels in the edge portions of the partial display panel. Therefore, the perception bezel width may decrease.

Figure 9:
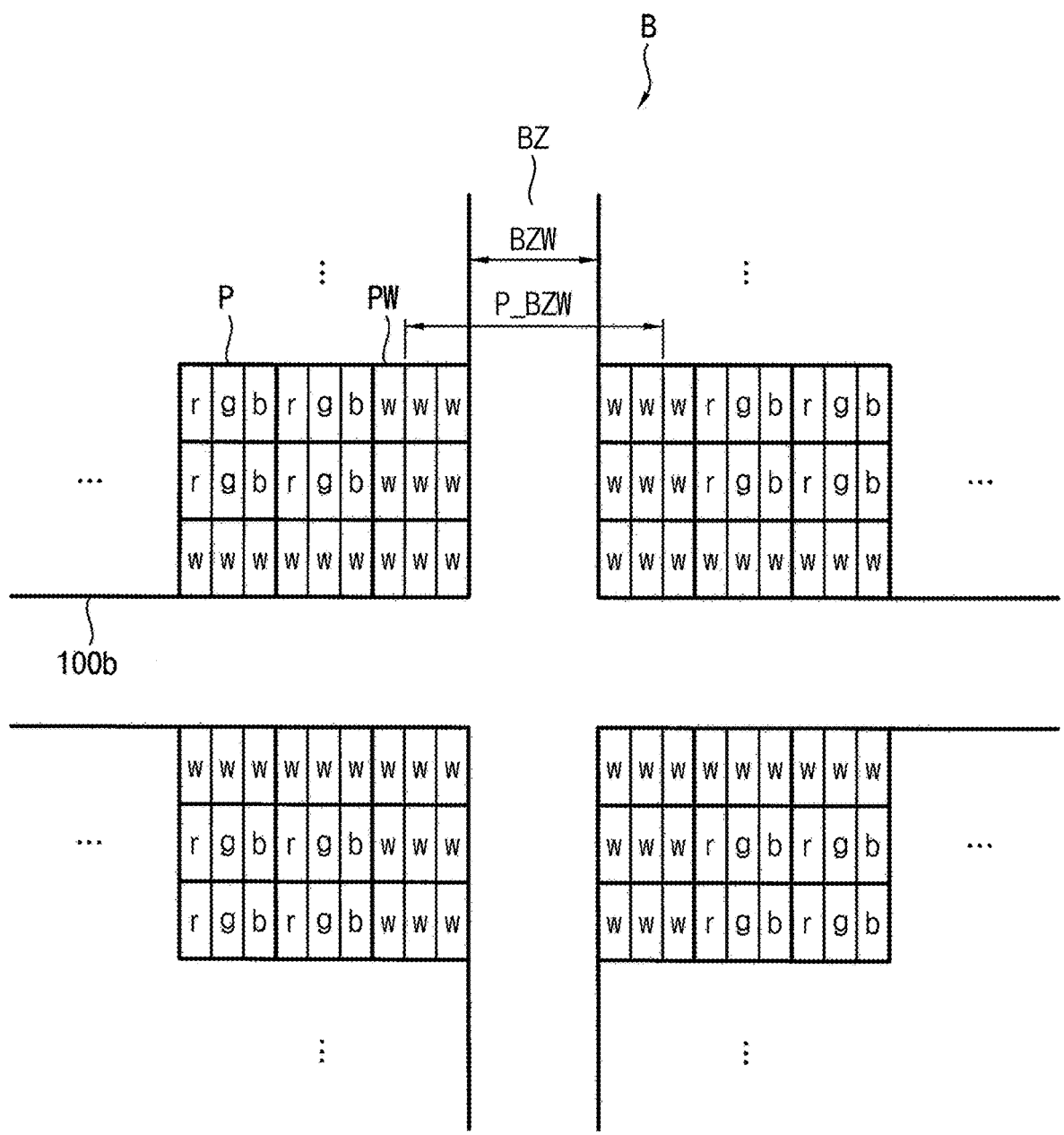
FIG. 9 is an enlarged diagram illustrating portion B of FIG. 8.

FIG. 8 is a diagram illustrating an exemplary embodiment of a screen of a tiled-display apparatus formed with a plurality of (partial) display apparatuses, and FIG. 9 is an enlarged diagram illustrating portion B of FIG. 8. Hereinafter, any repetitive explanation concerning FIGS. 2 and 3 will be omitted.

Referring to FIGS. 1, 8, and 9, the display apparatus in another exemplary embodiment may be one of a plurality of (partial) display apparatuses included in a tiled display apparatus. In this case, the display panel 100 included in the display apparatus in the exemplary embodiment of FIG. 1 may correspond to one of a plurality of partial screens included in a screen of the tiled display apparatus. That is, the display panel 100 may be one of partial display panels 100b of the tiled display apparatus.

A bezel BZ may be disposed between the partial display panels 100b of the tiled display apparatus.

The partial display panel 100b may include a plurality of pixels. In some exemplary embodiments, white pixels PW may be disposed in an edge portion of the partial display panel 100b. In an exemplary embodiment, as illustrated in FIG. 9, the white pixels PW may be disposed in the outermost of the partial display panel 100b, for example. That is, the pixels disposed in a first column, a last column, a first row, and a last row may be the white pixels PW. Each white pixel PW may include a plurality of white sub-pixels w, or three white sub-pixels w. Each pixel P disposed in remaining portion except the outermost of the partial display panel 100b may include a red sub-pixel r, a green sub-pixel g, and a blue sub-pixel b.

The other partial display panels included in the tiled display apparatus may be substantially the same as the partial display panel 100b.

In an alternative exemplary embodiment, the display apparatus may be a single display apparatus rather than the part of the tiled display apparatus, although not shown.

Figure 10:
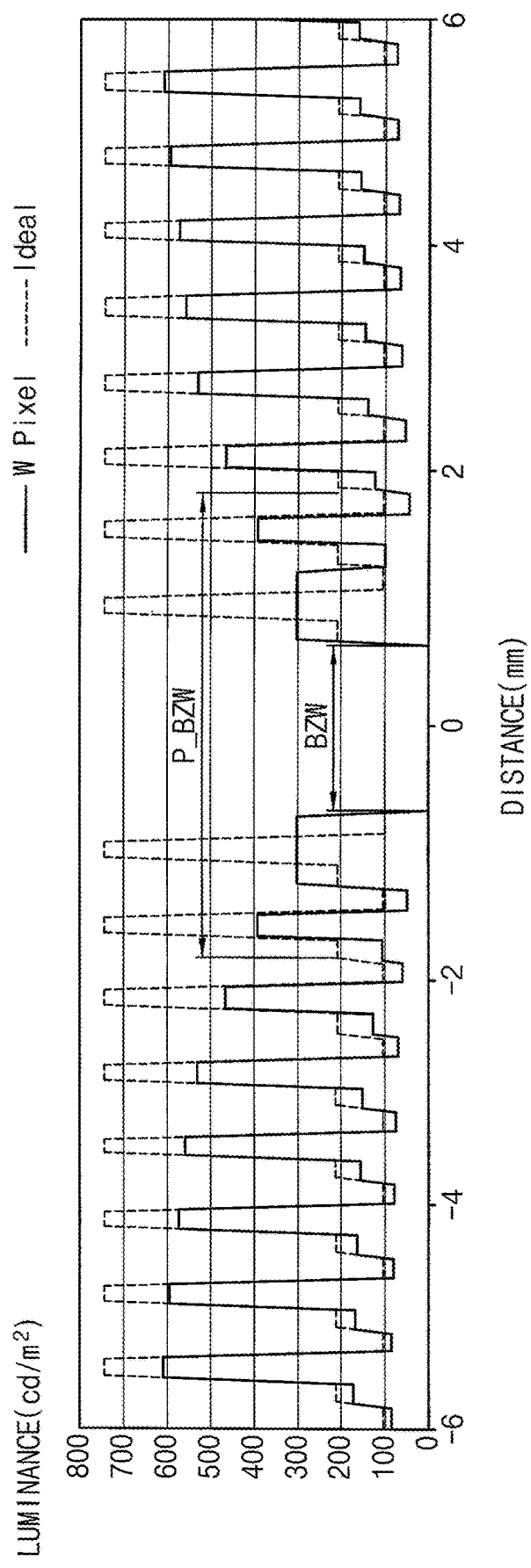
FIG. 10 is a graph illustrating an example of luminance of edge portions of adjacent (partial) display apparatuses according to a distance from a center of a bezel.

FIG. 10 is a graph illustrating an example of luminance of edge portions of adjacent (partial) display apparatuses according to a distance from a center of a bezel. Hereinafter, any repetitive explanation concerning FIGS. 4 through 6 will be omitted.

Specifically, FIG. 10 is a graph that represents luminance per pixel in an edge portion of a display panel when a white image representing a 255-gray level is displayed on the display panel. FIG. 10 includes a luminance graph (W Pixel) when an exemplary embodiment of a method for compensating decrease of luminance is applied and another luminance graph (Ideal) in an ideal case.

Referring to FIGS. 1, 4, 5, 6, 8, 9, and 10, in the ideal case (Ideal), the luminance per pixels are uniform in the edge portions of the partial display panel 100b. However, the luminance per pixels decreases toward to the edge of the partial display panel 100b before applying the exemplary embodiment of the method for compensating decrease of luminance in a real case ("As-Is" illustrated in FIG. 6). The luminance of the pixel in the outermost of the partial display panel 100b increases when this exemplary embodiment (W Pixel) of the method for compensating decrease of luminance according to the invention is applied as illustrated in FIG. 10.

In other exemplary embodiments, the timing controller 200 may compensate the input image data RGB corresponding to the white pixel PW and the input image data RGB corresponding to the pixel P using different methods.

Considering the decreasing ratio of luminance, the timing controller 200 may compensate the input image data RGB for the white pixel PW to have the target luminance of the pixel P corresponding to the white pixel PW.

In an exemplary embodiment, for example, suppose that a ratio of luminance of the red, green, blue, and white sub-pixels is 2:7:1:10, all of the gray levels of the input image data RGB for the white pixel PW are 255, and the target luminance of the pixel P corresponding to the white unit pixel PW is 10, the luminance of the white pixel PW may be 30. In this case, the timing controller 200 may compensate the input image data RGB corresponding to the white pixel PW to allow the luminance of the white pixel PW to be 10, considering the decreasing ratio of luminance.

The timing controller 200 may also apply the method for compensating decrease of luminance of FIG. 4 or 5 to the input image data RGB corresponding to the pixel P.

The perception bezel width P_BZW(As-Is) of a display apparatus model may be about 2.68 mm when this exemplary embodiment of the method for compensating decrease of luminance according to the invention is not applied. However, the perception bezel width P_BZW may decrease to about 1.46 mm when this exemplary embodiment of the method for compensating decrease of luminance according to the invention is applied. That is, the perception bezel width may decrease by about 1.22 mm.

A yellow pixel may be used instead of the white pixel PW in another exemplary embodiment (not shown). The yellow pixel may include a plurality of yellow sub-pixels.

In this exemplary embodiment of the invention, the display apparatus may have the white pixels PW as the outermost pixels instead of the RGB pixels P. Therefore, the display apparatus may compensate the decrease of luminance in the edge portion of the partial display panel even in the case that the maximum gray level is displayed since there is a margin in luminance to increase when the maximum gray level is displayed. Thus, the bezel width may decrease.

Figure 12A:
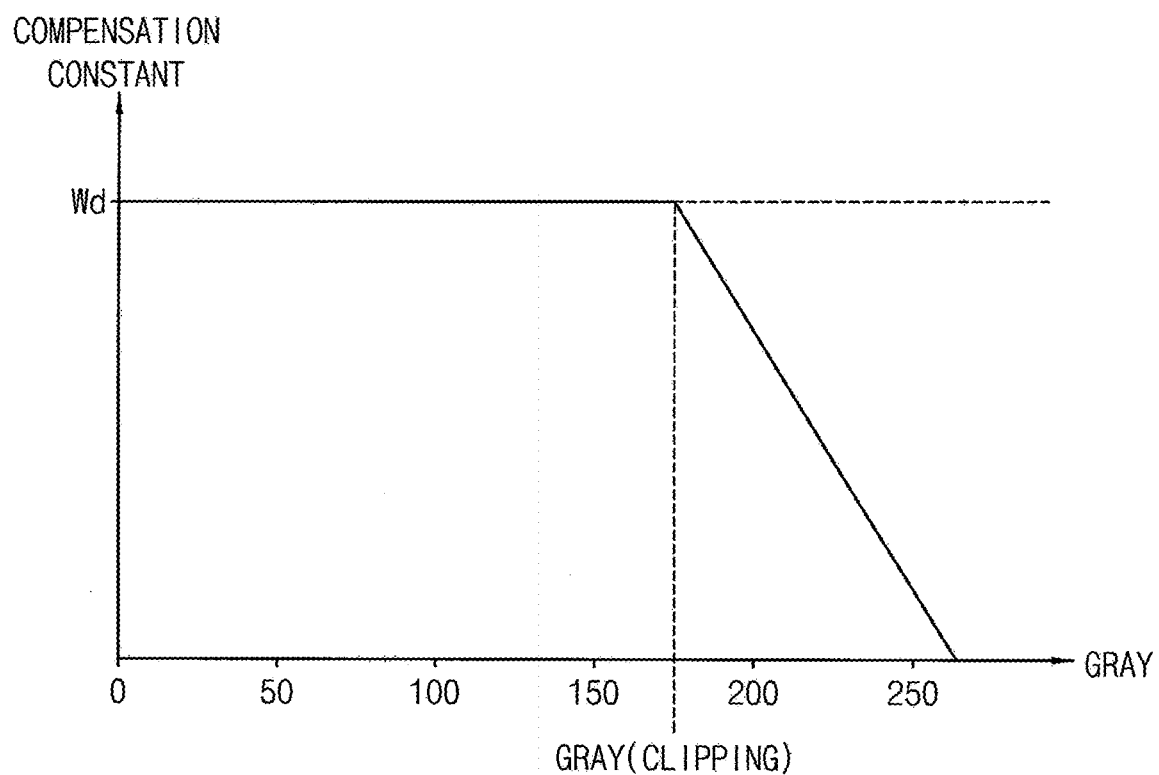
FIG. 12A is a graph illustrating an example of compensation constants used in methods of FIGS. 4 and 5, and FIG.
Figure 12B:
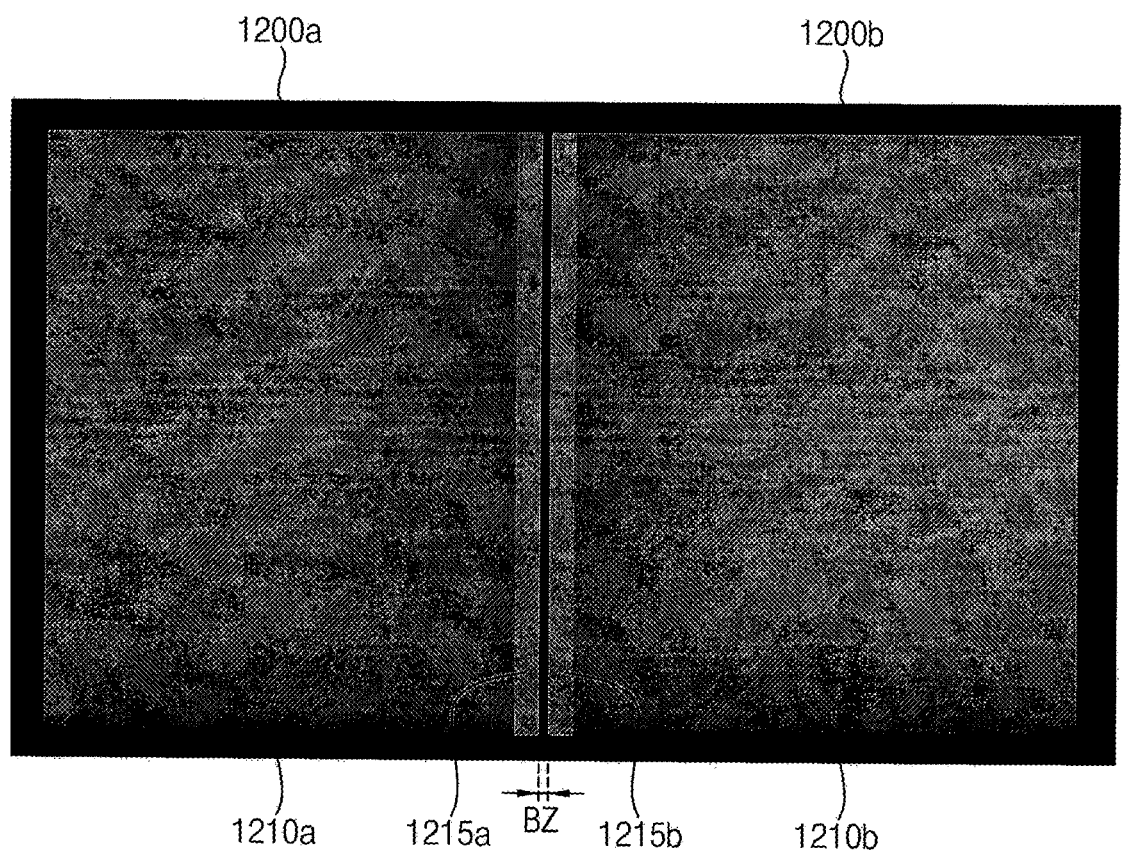

FIG. 11 is a flowchart illustrating an exemplary embodiment of a method for compensating decrease of luminance, FIG. 12A is a graph illustrating an example of compensation constants used in methods of FIGS. 4 and 5, and FIG. 12B is a diagram illustrating an example of a phenomenon that whitish blocks occur in edge portions adjacent to a bezel due to excessive compensation for a low gray image, and FIG. 13 is a graph illustrating an example of compensation constants used in a method of FIG. 11.

Referring to FIGS. 1, 11, 12 and 13, a driver (e.g., a timing controller 200 included in the driver) of a display apparatus in an exemplary embodiment may receive input image data RGB from an external device (e.g., a host processor) (S1100). The input image data RGB may be, but not limited to, RGB image data including red image data, green image data and blue image data.

The driver (e.g., the timing controller 200) may generate final image data RGBout by compensating the input image data RGB to increase luminances of pixels disposed in at least one edge portion of a display panel 100 among a plurality of pixels of the display panel 100 (S1120 through S1180), and may drive the display panel 100 based on the final image data RGBout. Here, the edge portion may be determined based on a perception bezel width P_BZW illustrated in FIG. 3. In an exemplary embodiment, the edge portion may be a portion of a display area of the display panel 100 from an edge of the display area to a line spaced apart by the perception bezel width P_BZW from the edge of the display area, or may be a portion of a display area of the display panel 100 from the edge of the display area to a line spaced apart by the perception bezel width P_BZW plus a predetermined length from the edge of the display area, for example. In some exemplary embodiments, the display apparatus may be (e.g., detachably) attached to at least one of other display apparatuses, and the edge portion of the display panel 100 may be adjacent to a bezel between the display panel of the display apparatus and a display panel of the at least one of other display apparatuses. In an exemplary embodiment illustrated in FIGS. 11 and 13, to generate the final image data RGBout for each pixel, the input image data RGB for the pixel may be compensated based on a compensation constant Wd determined according to a position of the pixel when the input image data RGB for the pixel represents a gray level higher than or equal to a first reference gray level GRAY1, and may be compensated based on a reduced compensation constant Wr that is reduced from the determined compensation constant Wd when the input image data RGB for the pixel represents the gray level lower than the first reference gray level GRAY1.

In particular, when the input image data RGB represents the gray level higher than or equal to the first reference gray level GRAY1 (S1120: NO), the input image data RGB may be compensated by, as a compensation constant W, the determined compensation constant Wd that is determined according to the position of the pixel (S1140 and S1180). In an exemplary embodiment, when the input image data RGB for each pixel represents the gray level higher than or equal to the first reference gray level GRAY1, the driver may generate the final image data RGBout for the pixel by compensating the input image data RGB for the pixel by an equation "RGBout=RGB*{(1+Wd)^(1/γ)}" (S1180), for example. Here, RGBout may represent the final image data for the pixel, RGB may represent the input image data for the pixel, Wd may represent the determined compensation constant for the pixel, and γ may represent a gamma value (e.g., about 2.2) of the display apparatus.

In some exemplary embodiments, the determined compensation constants according to the positions of the plurality of pixels may be determined based on a target luminance that is uniform or constant with respect to the positions of the plurality of pixels and real luminances that are changed depending on the positions of the plurality of pixels. In an exemplary embodiment, the target luminance may be determined based on desired luminances of backlight sources included in the display apparatus at the positions of the respective pixels, and the desired luminances of backlight sources may be uniform or constant with respect to the positions of the pixels, for example. The real luminance may be measured luminances of the backlight sources at the positions of the respective pixels, and the measured luminances of the backlight sources may be decreased as the position of each pixel becomes closer to an edge of the display panel 100. In another example, the target luminance may be desired luminances of the respective pixels when the input image data RGB representing a predetermined gray level (e.g., a 255-gray level), and the desired luminances of the respective pixels may be uniform or constant with respect to the positions of the pixels. The real luminance may be measured luminances of the respective pixels at the positions of the respective pixels, and the measured luminances of the respective pixels may be decreased as the position of each pixel becomes closer to the edge of the display panel 100.

In some exemplary embodiments, the determined compensation constant Wd for each pixel may be determined by an equation "Wd=Lt/Lr−1". Here, Wd may represent the determined compensation constant for the pixel, Lt may represent a target luminance of the pixel, and Lr may represent a real luminance of the pixel. That is, with respect to a 'decreasing ratio of luminance' described above with reference to FIGS. 4 through 6, the determined compensation constant Wd may be equal to "(100/'decreasing ratio of luminance')". According to the equation, the determined compensation constant Wd may be a difference between the target luminance Lt and the real luminance Lr divided by the real luminance Lr, and may be increased as a decrement of the real luminance Lr from the target luminance Lt increases. Thus, the determined compensation constant Wd for each pixel may be increased as a position of the pixel becomes closer to the edge of the display panel 100. The pixels in different positions may have different determined compensation constants Wd. Further, with respect to sub-pixels in the same pixel, the same determined compensation constant Wd may be used as described above with reference to FIG. 4 in some exemplary embodiments, and different determined compensation constants Wd may be used as described above with reference to FIG. 5 in other exemplary embodiments.

In some exemplary embodiments, the driver of the display apparatus of FIG. 1 may store compensation constant information representing the determined compensation constants Wd (or parameters derived from the determined compensation constants Wd). In an exemplary embodiment, the compensation constant information may be stored in an internal memory of the timing controller 200, or a memory external to the timing controller 200, for example. Further, the driver (e.g., the timing controller 200) may compensate the input image data RGB based on the compensation constant information.

In some exemplary embodiments, when the input image data RGB for each pixel represents the gray level higher than or equal to a third reference gray level GRAY(CLIPPING) that is higher than the first reference gray level GRAY1 (S1120: NO and S1130: NO), the driver may generate the final image data RGBout representing the maximum gray level (e.g., a 255-gray level) (S1170). In some exemplary embodiments, the third reference gray level GRAY(CLIPPING) may be the minimum one of gray levels of the input image data RGB that become higher than or equal to the maximum gray level (e.g., the 255-gray level) after being compensated (or the compensation in the operation of S1180) based on the determined compensation constant Wd. In an exemplary embodiment, when a value of $\{(1+Wd)^{\wedge}(1/\gamma)\}$ calculated based on the determined compensation constant Wd for a pixel is 2, a result of the operation of S1180 may become greater than 255 when the input image data RGB represents 128 or more, and thus the third reference gray level GRAY(CLIPPING) for the pixel may be 128, for example. The third reference gray level GRAY (CLIPPING) may be a gray level that is to be clipped, and thus may be also referred to as a "clipping gray level".

With respect to the input image data RGB representing the gray level higher than or equal to the third reference gray level GRAY(CLIPPING), to output the final image data RGBout representing the maximum gray level, the data driver may generate the final image data RGBout representing the maximum gray level without performing the compensation for the input image data RGB in the operation of S1180 in some exemplary embodiments, may convert a gray level of the final image data RGBout generated by performing the compensation for the input image data RGB in the operation of S1180 based on the determined compensation constant Wd to the maximum gray level in other exemplary embodiments, or may adjust the compensation constant W to be lower than the determined compensation constant Wd such that the final image data RGBout after the compensation represents the maximum gray level in still other exemplary embodiments. In an exemplary embodiment, as illustrated in FIG. 13, the driver may linearly decrease the compensation constant W as the gray level of the input image data RGB increases from the third reference gray level GRAY(CLIPPING) to the maximum reference gray level (e.g., the 255-gray level), for example.

When the input image data RGB represents the gray level lower than the first reference gray level GRAY1 (S1120: YES), the input image data RGB may be compensated by, as the compensation constant W, the reduced compensation constant Wr that is reduced from the determined compensation constant Wd (S1150 and S1180). The reduced compensation constant Wr may gradually increase as the gray level of the input image data RGB increases from the minimum gray level (e.g., 0-gay level) to the first reference gray level GRAY1. In some exemplary embodiments, as illustrated in FIG. 13, the reduced compensation constant Wr may linearly increase as the gray level of the input image data RGB increases from the minimum gray level to the first reference gray level GRAY1.

When the input image data RGB for each pixel represents the gray level lower than the first reference gray level GRAY1, the driver may calculate the reduced compensation constant Wr for the pixel by an equation "Wr=Wd*RGB/GRAY1". Here, Wr may represent the reduced compensation constant for the pixel, Wd may represent the determined compensation constant for the pixel, RGB may represent the input image data for the pixel, and GRAY1 may represent the first reference gray level. Further, the driver may generate the final image data RGBout for the pixel by compensating the input image data RGB for pixel by an equation "RGBout=RGB*$\{(1+Wr)^{\wedge}(1/\gamma)\}$" (S1180). Here, RGBout may represent the final image data for the pixel, and γ may represent the gamma value (e.g., about 2.2) of the display apparatus.

As described above, as illustrated in FIGS. 11 and 13, the display apparatus in an exemplary embodiment may divide a grayscale of the input image data RGB into a low gray section lower than the first reference gray level GRAY1, a middle gray section higher than or equal to the first reference gray level GRAY1 and lower than the third reference gray level GRAY(CLIPPING), and a high gray section higher than or equal to the third reference gray level GRAY (CLIPPING), may generate the final image data RGBout by compensating the input image data RGB in the low gray section based on the reduced compensation constant Wr lower than the determined compensation constant Wd, may generate the final image data RGBout by compensating the input image data RGB in the middle gray section based on the determined compensation constant Wd, and may generate the final image data RGBout representing the maximum gray level by converting the input image data RGB in the high gray section to the maximum gray level. Further, the driver may drive the display panel 100 based on the final image data RGBout to display an image corresponding to the final image data RGBout (S1190).

In methods of FIGS. 4 and 5, as illustrated in FIG. 12A, not only the input image data RGB the middle gray section, but also the input image data RGB in the low gray section and may be compensated based on the determined compensation constant Wd. In this case, the input image data RGB in the low gray section may be excessively compensated due to a quantization error, a gray margin insufficiency, or the like. Accordingly, as illustrated in FIG. 12B, in a case that a low gray image is displayed in a display system (e.g., a tiled-display apparatus) where a first (partial) display apparatus 1200a and a second (partial) display apparatus 1200b are attached to each other, whitish blocks may occur in an edge portion 1215a of a first partial display panel 1210a and an edge portion 1215b of a second partial display panel 1210b that are adjacent to a bezel BZ between the first partial display panel 1210a and the second partial display panel 1210b.

However, in an exemplary embodiment of the method of FIG. 11, the reduced compensation constant Wr lower than the determined compensation constant Wd determined according to a pixel position may be used with respect to the input image data RGB lower than the first reference gray level GRAY1, and thus a phenomenon that the whitish block occurs in the edge portion adjacent to the bezel due to the excessive compensation for the low gray image may be prevented.

FIG. 14 is a flowchart illustrating an exemplary embodiment of a method for compensating decrease of luminance, and FIG. 15 is a graph illustrating an example of compensation constants used in a method of FIG. 14.

Unlike a method of FIGS. 11 and 13 dividing a grayscale of the input image data RGB into three gray sections, a method of FIGS. 14 and 15 may divide the grayscale of the input image data RGB into four gray sections, or a ultra-low gray section lower than a second reference gray level GRAY2 that is lower than a first reference gray level GRAY1, a low gray section higher than or equal to the second reference gray level GRAY2 and lower than the first reference gray level GRAY1, a middle gray section higher than or equal to the first reference gray level GRAY1 and lower than a third reference gray level GRAY(CLIPPING), and a high gray section higher than or equal to the third reference gray level GRAY(CLIPPING). Thus, the method of FIGS. 14 and 15 may be similar to the method of FIGS. 11 and 13, except that the ultra-low gray section lower than the second reference gray level GRAY2 is added.

Referring to FIGS. 1, 14 and 15, when the input image data RGB represents a gray level lower than the second reference gray level GRAY2 (S1110: YES), a driver (e.g., a timing controller 200 included in the driver) of a display apparatus in an exemplary embodiment may generate final image data RGBout the same as the input image data RGB. That is, when the input image data RGB is lower than the second reference gray level GRAY2, compensation in an operation of S1180 may not be performed. Accordingly, a phenomenon that a whitish block occurs in the ultra-low gray section lower than the second reference gray level GRAY2 may be further prevented.

When the input image data RGB represents the gray level higher than or equal to the second reference gray level GRAY2 and lower than the first reference gray level GRAY1 (S1110: NO and S1120: YES), the input image data RGB may be compensated by, as a compensation constant W, a reduced compensation constant Wr that is reduced from a determined compensation constant Wd (S1155 and S1180). The reduced compensation constant Wr may gradually (e.g., linearly as illustrated in FIG. 15) increase as the gray level of the input image data RGB increases from the second reference gray level GRAY2 to the first reference gray level GRAY1.

In some exemplary embodiments, when the input image data RGB for each pixel represents the gray level higher than or equal to the second reference gray level GRAY2 and lower than the first reference gray level GRAY1, the driver may calculate the reduced compensation constant for the pixel by an equation "Wr=Wd*(RGB−GRAY2)/(GRAY1−GRAY2)" (S1155). Here, Wr may represent the reduced compensation constant for the pixel, Wd may represent the determined compensation constant for the pixel, RGB may represent the input image data for the pixel, GRAY1 may represent the first reference gray level, and GRAY2 may represent the second reference gray level. Further, the driver may generate the final image data RGBout for the pixel by compensating the input image data RGB for the pixel by an equation "RGBout=RGB*{(1+Wr)^(1/γ)}" (S1180). Here, RGBout may represent the final image data for the pixel, and γ may represent a gamma value (e.g., about 2.2) of the display apparatus.

As described above, as illustrated in FIGS. 14 and 15, the display apparatus in an exemplary embodiment may divide the grayscale of the input image data RGB into the ultra-low gray section lower than the second reference gray level GRAY2, the low gray section higher than or equal to the second reference gray level GRAY2 and lower than the first reference gray level GRAY1, the middle gray section higher than or equal to the first reference gray level GRAY1 and lower than the third reference gray level GRAY(CLIPPING), and the high gray section higher than or equal to the third reference gray level GRAY(CLIPPING), may generate the final image data RGBout the same as the input image data RGB in the ultra-low gray section, may generate the final image data RGBout by compensating the input image data RGB in the low gray section based on the reduced compensation constant Wr lower than the determined compensation constant Wd, may generate the final image data RGBout by compensating the input image data RGB in the middle gray section based on the determined compensation constant Wd, and may generate the final image data RGBout representing the maximum gray level (e.g., 255) by converting the input image data RGB in the high gray section to the maximum gray level. Further, the driver may drive the display panel 100 based on the final image data RGBout to display an image corresponding to the final image data RGBout (S1190). Accordingly, a phenomenon that a whitish block occurs in an edge portion adjacent to the bezel due to excessive compensation for a low gray image may be further prevented.

FIG. 16 is a block diagram illustrating an exemplary embodiment of a display system, FIG. 17 is a flowchart illustrating an exemplary embodiment of an operation of a display system, and FIG. 18 is a flowchart illustrating another exemplary embodiment of an operation of a display system.

Referring to FIG. 16, an exemplary embodiment of a display system 1300 may include a plurality of (partial) display apparatuses 1310, and a host processor 1350 providing image data PRGB to the plurality of (partial) display apparatuses 1310. In some exemplary embodiments, each of the plurality of (partial) display apparatuses 1310 may be a display apparatus of FIG. 1. In some exemplary embodiments, the display system 1300 may be a tiled-display apparatus where the plurality of (partial) display apparatuses 1310 is arranged in a tile shape.

The plurality of (partial) display apparatuses 1310 may be arranged in the tile shape or a matrix form. Although FIG. 16 illustrates an example where the plurality of (partial) display apparatuses 1310 is arranged in a 4*4 matrix form, in an exemplary embodiment, the display system 1300 may include plurality of (partial) display apparatuses 1310 arranged in a N*M matrix form, where each of N and M is any integer greater than zero. In some exemplary embodiments, the plurality of (partial) display apparatuses 1310 may be detachably attached to each other.

The host processor 1350 may receive source image data SRGB. In an exemplary embodiment, the host processor 1350 may receive the source image data SRGB broadcasted from an external device (e.g., a station), or may receive the source image data SRGB from an internal memory device, for example. The host processor 1350 may divide the source image data SRGB into a plurality of partial input image data PRGB respectively corresponding to the plurality of (partial) display apparatuses 1310, and may provide the plurality of partial input image data PRGB to the plurality of (partial) display apparatuses 1310, respectively. In an exemplary embodiment, the host processor 1350 may be coupled to the plurality of (partial) display apparatuses 1310 in a multi-drop manner, and the host processor 1350 may provide corresponding partial input image data PRGB to each (partial) display apparatus 1310, for example.

In some exemplary embodiments, as illustrated in FIG. 17, each (partial) display apparatus 1310 of the display system 1300 may perform edge luminance increasing compensation as illustrated in FIGS. 4, 5, 11 and 14. The host processor 1350 may divide the source image data SRGB into the plurality of partial input image data PRGB respectively corresponding to the plurality of (partial) display apparatuses 1310 (S1410), and may provide the plurality of partial input image data PRGB to the plurality of (partial) display apparatuses 1310, respectively (S1430). Each (partial) display apparatus 1310 may generate partial final image data PRGBout by compensating the corresponding partial input image data PRGB to increase luminances of pixels disposed in at least one edge portion of a partial display panel (S1450), and may display an image based on the partial final image data PRGBout (S1470). In some exemplary embodiments, as described above with reference to FIGS. 11 through 15, in each (partial) display apparatus 1310, the corresponding partial input image data PRGB for each pixel may be compensated based on a compensation constant determined according to a position of the pixel when the corresponding partial input image data PRGB for the pixel represents a gray level higher than or equal to a first reference gray level, and may be compensated based on a reduced compensation constant that is reduced from the determined compensation constant when the corresponding partial input image data PRGB for the pixel represents the gray level lower than the first reference gray level. Accordingly, a phenomenon that a whitish block occurs in an edge portion adjacent to a bezel due to excessive compensation for a low gray image may be prevented.

In other exemplary embodiments, as illustrated in FIG. 18, the host processor 1350 of the display system 1300 may perform the edge luminance increasing compensation as illustrated in FIGS. 4, 5, 11 and 14. The host processor 1350 may divide the source image data SRGB into the plurality of partial input image data PRGB respectively corresponding to the plurality of (partial) display apparatuses 1310 (S1410), may generate a plurality of partial final image data PRGBout by compensating the plurality of partial input image data PRGB to increase luminances of pixels disposed in at least one edge portion of a partial display panel of each of the plurality of (partial) display apparatuses 1310 (S1420), and may provide the plurality of partial final image data PRGBout to the plurality of (partial) display apparatuses 1310, respectively (S1435). Each (partial) display apparatus 1310 may display an image based on corresponding partial final image data PRGBout provided from the host processor 1350 (S1470). In some exemplary embodiments, as described above with reference to FIGS. 11 through 15, in the host processor 1350, each partial input image data PRGB for each pixel may be compensated based on a compensation constant determined according to a position of the pixel when the partial input image data PRGB for the pixel represents the gray level higher than or equal to the first reference gray level, and may be compensated based on the reduced compensation constant that is reduced from the determined compensation constant when the partial input image data PRGB for the pixel represents the gray level lower than the first reference gray level. Accordingly, the phenomenon that the whitish block occurs in the edge portion adjacent to the bezel due to the excessive compensation for the low gray image may be prevented.

In an exemplary embodiment, the display system 1300 may be the tiled-display apparatus including the plurality of (partial) display apparatuses 1310. Exemplary embodiments of the invention may be applied to any display apparatus 1310 or any electronic device that is the display system 1300. Exemplary embodiments of the invention may be applied to a digital television ("TV"), a three-dimensional ("3D") TV, a smart phone, a tablet computer, a mobile phone, a personal computer ("PC"), a home appliance, a laptop computer, etc., for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display apparatus comprising:
a display panel including a plurality of pixels; and
a driver which receives input image data, generates final image data by compensating the input image data to increase luminances of pixels disposed in at least one edge portion of the display panel among the plurality of pixels, and drives the display panel based on the final image data,
wherein the input image data for a pixel of the pixels is compensated based on a compensation constant determined according to a position of the pixel when the input image data for the pixel represents a gray level higher than or equal to a first reference gray level, and is compensated based on a reduced compensation constant which is reduced from the determined compensation constant when the input image data for the pixel represents the gray level lower than the first reference gray level, wherein the reduced compensation constant gradually increases as the gray level of the input image data increases from a minimum gray level to the first reference gray level, and wherein, when the input image data for the pixel represents the gray level lower than the first reference gray level, the driver:

calculates the reduced compensation constant for the pixel by an equation "Wr=Wd*RGB/GRAY1", where Wr represents the reduced compensation constant for the pixel, Wd represents the determined compensation constant for the pixel, RGB represents the input image data for the pixel, and GRAY1 represents the first reference gray level; and generates the final image data for the pixel by compensating the input image data for the pixel by an equation "RGBout=RGB*{(1+Wr)^(1/γ)}", where RGBout represents the final image data for the pixel, and γ represents a gamma value of the display apparatus.

2. The display apparatus of claim 1, wherein the minimum gray level is a 0-gray level.

3. The display apparatus of claim 1, wherein the reduced compensation constant linearly increases as the gray level of the input image data increases from the minimum gray level to the first reference gray level.

4. The display apparatus of claim 1, wherein the driver generates the final image data for the pixel equal to the input image data for the pixel when the input image data for the pixel represents the gray level lower than a second reference gray level, and wherein the second reference gray level is lower than the first reference gray level.

5. The display apparatus of claim 4, wherein the reduced compensation constant gradually increases as the gray level of the input image data increases from the second reference gray level to the first reference gray level.

6. The display apparatus of claim 4, wherein, when the input image data for the pixel represents the gray level higher than or equal to the second reference gray level and lower than the first reference gray level, the driver:

calculates the reduced compensation constant for the pixel by an equation "Wr=Wd*(RGB−GRAY2)/(GRAY1−GRAY2)", where Wr represents the reduced compensation constant for the pixel, Wd represents the determined compensation constant for the pixel, RGB represents the input image data for the pixel, GRAY1 represents the first reference gray level, and GRAY2 represents the second reference gray level; and generates the final image data for the pixel by compensating the input image data for the pixel by an equation "RGBout=RGB*{(1+Wr)^(1/γ)}", where RGBout represents the final image data for the pixel, and γ represents a gamma value of the display apparatus.

7. The display apparatus of claim 1, wherein, when the input image data for the pixel represents the gray level higher than or equal to the first reference gray level, the driver:

generates the final image data for the pixel by compensating the input image data for the pixel by an equation "RGBout=RGB*{(1+Wr)^(1/γ)}", where RGBout represents the final image data for the pixel, RGB represents the input image data for the pixel, Wd represents the determined compensation constant for the pixel, and γ represents a gamma value of the display apparatus.

8. The display apparatus of claim 1, wherein the driver generates the final image data representing a maximum gray level when the input image data for the pixel represents the gray level higher than or equal to a third reference gray level, and wherein the third reference gray level is higher than the first reference gray level.

9. The display apparatus of claim 8, wherein the third reference gray level is the minimum gray level of gray levels of the input image data which become higher than or equal to the maximum gray level after being compensated based on the determined compensation constant.

10. The display apparatus of claim 8, wherein the maximum gray level is a 255-gray level.

11. The display apparatus of claim 1, wherein the driver stores compensation constant information for the determined compensation constant, and compensates the input image data based on the compensation constant information.

12. The display apparatus of claim 1, wherein the determined compensation constant is determined based on a target luminance which is constant with respect to positions of the plurality of pixels and a real luminance which is changed depending on the positions of the plurality of pixels.

13. The display apparatus of claim 1, wherein the determined compensation constant for the pixel is determined by an equation "Wd=Lt/Lr−1", where Wd represents the determined compensation constant for the pixel, Lt represents a target luminance of the pixel, and Lr represents a real luminance of the pixel.

14. The display apparatus of claim 1, wherein the determined compensation constant for the pixel is increased as the position of the pixel becomes closer to an edge of the display panel.

15. The display apparatus of claim 1, wherein the display apparatus is attached to at least one of other display apparatuses, and wherein the at least one edge portion of the display panel is adjacent to a bezel between the display panel of the display apparatus and a display panel of the at least one of the other display apparatuses.

16. The display apparatus of claim 1, wherein the display apparatus is detachably attached to at least one of other display apparatuses.

17. A display system comprising:

a plurality of partial display apparatuses arranged in a tile shape; and a host processor which divides source image data into a plurality of partial input image data respectively corresponding to the plurality of partial display apparatuses, wherein each of the plurality of partial display apparatuses comprises a partial display panel including a plurality of pixels, and a driver which receives corresponding partial input image data among the plurality of partial input image data, generates partial final image data by compensating the corresponding partial input image data to increase luminances of pixels disposed in at least one edge portion of the partial display panel among the plurality of pixels, and drives the partial display panel based on the partial final image data, wherein, in each of the plurality of partial display apparatuses, the corresponding partial input image data for a pixel of the pixels is compensated based on a compensation constant determined according to a position of the pixel when the corresponding partial input image data for the pixel represents a gray level higher than or equal to a first reference gray level, and is compensated based on a reduced compensation constant which is reduced from the determined compensation constant when the corresponding partial input image data for the pixel represents the gray level lower than the first reference gray level, wherein the reduced compensation constant gradually increases as the gray level of the corresponding partial input image data increases from a minimum gray level to the first reference gray level, and wherein, when the corresponding partial input image data for the pixel represents the gray level lower than the first reference gray level, the driver:

calculates the reduced compensation constant for the pixel by an equation "Wr=Wd*RGB/GRAY1", where Wr represents the reduced compensation constant for the pixel, Wd represents the determined compensation constant for the pixel, RGB represents the corresponding partial input image data for the pixel, and GRAY1 represents the first reference gray level; and generates the partial final image data for the pixel by compensating the corresponding partial input image data for the pixel by an equation "RGBout=RGB*{(1+Wr)^(1/γ)}", where RGBout represents the partial final image data for the pixel, and γ represents a gamma value of each of the plurality of partial display apparatuses.

18. A display system comprising:

a plurality of partial display apparatuses arranged in a tile shape; and a host processor which divides source image data into a plurality of partial input image data respectively corresponding to the plurality of partial display apparatuses, generates a plurality of partial final image data by compensating the plurality of partial input image data to increase luminances of pixels disposed in at least one edge portion of a partial display panel of each of the plurality of partial display apparatuses, and provides the plurality of partial final image data to the plurality of partial display apparatuses, respectively, wherein, in the host processor, each of the plurality of partial input image data for a pixel of the pixels is compensated based on a compensation constant determined according to a position of the pixel when the each of the plurality of partial input image data for the pixel represents a gray level higher than or equal to a first reference gray level, and is compensated based on a reduced compensation constant which is reduced from the determined compensation constant when the each of the plurality of partial input image data for the pixel represents the gray level lower than the first reference gray level, wherein the reduced compensation constant gradually increases as the gray level of the each of the plurality of partial input image data increases from a minimum gray level to the first reference gray level, and wherein, when the each of the plurality of partial input image data for the pixel represents the gray level lower than the first reference gray level, the host processor:

calculates the reduced compensation constant for the pixel by an equation "Wr=Wd*RGB/GRAY1", where Wr represents the reduced compensation constant for the pixel, Wd represents the determined compensation constant for the pixel, RGB represents the each of the plurality of partial input image data for the pixel, and GRAY1 represents the first reference gray level; and generates each of the plurality of partial final image data for the pixel by compensating the each of the plurality of partial input image data for the pixel by an equation "RGBout=RGB*{(1+Wr)^(1/γ)}", where RGBout represents the each of the plurality of partial final image data for the pixel, and γ represents a gamma value of each of the plurality of partial display apparatuses.

* * * * *